US008518146B2

(12) United States Patent
Li

(10) Patent No.: US 8,518,146 B2
(45) Date of Patent: Aug. 27, 2013

(54) METAL REDUCTION PROCESSES, METALLURGICAL PROCESSES AND PRODUCTS AND APPARATUS

(75) Inventor: Bairong Li, Guangzhou (CN)

(73) Assignee: GB Group Holdings Limited, Shanghai (CN)

( * ) Notice: Subject to any disclaimer, the term of this patent is extended or adjusted under 35 U.S.C. 154(b) by 257 days.

(21) Appl. No.: 12/824,611

(22) Filed: Jun. 28, 2010

(65) Prior Publication Data

US 2011/0020663 A1 Jan. 27, 2011

Related U.S. Application Data

(60) Provisional application No. 61/213,645, filed on Jun. 29, 2009.

(51) Int. Cl.
*B22F 9/20* (2006.01)

(52) U.S. Cl.
USPC .............................................. 75/359; 75/364

(58) Field of Classification Search
None
See application file for complete search history.

(56) References Cited

U.S. PATENT DOCUMENTS

| | | | | |
|---|---|---|---|---|
| 3,567,426 A | | 3/1971 | Segura et at. | |
| 3,617,256 A | | 11/1971 | Joseph et al. | |
| 3,634,064 A | | 1/1972 | Vedensky et al. | |
| 3,663,202 A | | 5/1972 | Rüter et al. | |
| 3,725,043 A | | 4/1973 | Kawai et al. | |
| 3,753,682 A | | 8/1973 | Kohl | |
| 3,770,416 A | | 11/1973 | Goksel | |
| 3,899,320 A | | 8/1975 | Benecke et al. | |
| 3,929,463 A | | 12/1975 | Svensson | |
| 4,001,011 A | * | 1/1977 | Agarwal et al. | 75/500 |
| 4,084,521 A | | 4/1978 | Herbold et al. | |
| 4,235,676 A | | 11/1980 | Chambers | |
| 4,362,558 A | | 12/1982 | Desnoes et al. | |
| 4,740,239 A | | 4/1988 | Tuovinen et al. | |
| 4,756,748 A | | 7/1988 | Lu et al. | |
| 4,797,524 A | | 1/1989 | Moret et al. | |

(Continued)

FOREIGN PATENT DOCUMENTS

| | | |
|---|---|---|
| AU | 199341268 C | 12/1993 |
| AU | B-39990/93 | 1/1994 |

(Continued)

OTHER PUBLICATIONS

Barekar, N.S. et al., "Processing of Ultrafine-Size Particulate Metal Matrix Composites by Advanced Shear Technology," Jan. 17, 2009 (8 pages).

(Continued)

*Primary Examiner* — George Wyszomierski
(74) *Attorney, Agent, or Firm* — Finnegan, Henderson, Farabow, Garrett & Dunner, LLP

(57) ABSTRACT

The disclosure relates to metal reduction processes, which comprise adding a mixture comprising at least one metal-containing material, at least one reducing agent, and at least one additive into a reactor, heating the reactor to a selected reduction temperature, moving the mixture through the reactor while stirring the mixture, allowing a reduction period to occur, and obtaining a resulting composition comprising at least one zero-valent metal and a residue. The disclosure also relates to metallurgical processes comprising the metal reduction process, and products made by the metal reduction process. The disclosure further relates to metal reduction apparatuses, as well as metal reduction systems and metallurgical systems comprising the metal reduction apparatuses.

32 Claims, 8 Drawing Sheets

(56) References Cited

U.S. PATENT DOCUMENTS

| | | | | |
|---|---|---|---|---|
| 4,822,410 | A | 4/1989 | Matovich | |
| 4,824,479 | A | 4/1989 | Matsuoka et al. | |
| 4,836,847 | A | 6/1989 | Bishop et al. | |
| 5,131,942 | A | 7/1992 | Katayama et al. | |
| 5,178,666 | A | 1/1993 | Diaz et al. | |
| 5,316,471 | A | 5/1994 | Nell | |
| 5,330,556 | A | 7/1994 | Hardie et al. | |
| 5,385,600 | A | 1/1995 | Jounela | |
| 5,437,705 | A | 8/1995 | DeLisle et al. | |
| 5,480,070 | A | 1/1996 | Wallner et al. | |
| 5,486,229 | A | 1/1996 | An | |
| 5,554,206 | A | 9/1996 | Czermak et al. | |
| 5,571,306 | A | 11/1996 | Myerson et al. | |
| 5,582,631 | A | 12/1996 | Myerson et al. | |
| 5,637,133 | A | 6/1997 | Munnix et al. | |
| 5,667,555 | A | 9/1997 | Myerson et al. | |
| 5,669,955 | A | 9/1997 | Vuletic et al. | |
| 5,683,488 | A | 11/1997 | Myerson et al. | |
| 5,685,524 | A | 11/1997 | Jaffre et al. | |
| 5,776,226 | A | 7/1998 | Edlinger | |
| 5,782,957 | A | 7/1998 | Rinker et al. | |
| 5,843,204 | A | 12/1998 | Ishikawa et al. | |
| 5,855,645 | A | 1/1999 | Myerson et al. | |
| 5,944,871 | A | 8/1999 | Nagl | |
| 5,972,066 | A | 10/1999 | Lehtinen | |
| 5,997,609 | A | 12/1999 | Diehl et al. | |
| 6,030,432 | A | 2/2000 | Kepplinger et al. | |
| 6,048,381 | A | 4/2000 | Kepplinger et al. | |
| 6,048,382 | A | 4/2000 | Greenwalt | |
| 6,074,456 | A | 6/2000 | Freytag et al. | |
| 6,129,777 | A | 10/2000 | Fuji et al. | |
| 6,152,983 | A | 11/2000 | Kamijo et al. | |
| 6,187,076 | B1 | 2/2001 | Sugahara et al. | |
| 6,214,082 | B1 | 4/2001 | Rosenfellner et al. | |
| 6,214,086 | B1 | 4/2001 | Montague et al. | |
| 6,221,126 | B1 | 4/2001 | Rosenfellner | |
| 6,241,801 | B1 | 6/2001 | Kepplinger et al. | |
| 6,241,803 | B1 | 6/2001 | Fuji | |
| 6,241,804 | B1 | 6/2001 | Rosenfellner | |
| 6,248,152 | B1 | 6/2001 | Takeda et al. | |
| 6,264,721 | B1 | 7/2001 | Takeda et al. | |
| 6,277,171 | B1 | 8/2001 | Mantel | |
| 6,302,938 | B1 | 10/2001 | Kamijo et al. | |
| 6,340,378 | B1 | 1/2002 | Hinrichsen | |
| 6,352,572 | B1 | 3/2002 | Beyzavi et al. | |
| 6,352,573 | B2 | 3/2002 | McClelland, Jr. et al. | |
| 6,355,088 | B1 | 3/2002 | Greenwalt | |
| 6,372,016 | B1 | 4/2002 | Kamikawa et al. | |
| 6,379,421 | B1 | 4/2002 | Salinas-Fernández et al. | |
| 6,383,251 | B1 * | 5/2002 | Sherwood | 75/384 |
| 6,383,252 | B1 | 5/2002 | Roth et al. | |
| 6,391,084 | B1 | 5/2002 | Ito et al. | |
| 6,391,249 | B1 | 5/2002 | Heckmann et al. | |
| 6,402,803 | B1 | 6/2002 | Katayama et al. | |
| 6,423,116 | B1 | 7/2002 | Ottow | |
| 6,482,351 | B2 | 11/2002 | Kamikawa et al. | |
| 6,506,231 | B2 | 1/2003 | Negami et al. | |
| 6,602,320 | B2 | 8/2003 | Fuji et al. | |
| 6,602,322 | B2 | 8/2003 | McClelland, Jr. | |
| 6,605,130 | B2 | 8/2003 | Takenaka et al. | |
| 6,630,010 | B2 | 10/2003 | Ito et al. | |
| 6,648,942 | B2 | 11/2003 | Hoffman et al. | |
| 6,652,620 | B2 | 11/2003 | Miyagawa et al. | |
| 6,669,470 | B2 | 12/2003 | Atsushi et al. | |
| 6,749,425 | B1 | 6/2004 | Nakayama | |
| 6,814,924 | B2 | 11/2004 | Urabe et al. | |
| 6,830,605 | B2 | 12/2004 | Halpin et al. | |
| 6,918,945 | B2 | 7/2005 | Uenosono et al. | |
| 6,932,853 | B2 | 8/2005 | Bratina et al. | |
| 7,014,678 | B2 | 3/2006 | Schwetlick | |
| 7,048,774 | B2 | 5/2006 | Halpin et al. | |
| 7,227,882 | B2 | 6/2007 | Schaefer | |
| 7,384,450 | B2 | 6/2008 | Kikuchi | |
| 7,407,526 | B2 | 8/2008 | Hu et al. | |
| 7,422,622 | B2 | 9/2008 | Leigh | |
| 7,473,393 | B2 | 1/2009 | Ishiwata et al. | |
| 7,544,227 | B2 | 6/2009 | Kruesi et al. | |
| 7,585,350 | B2 | 9/2009 | Duarte et al. | |
| 2001/0027700 | A1 | 10/2001 | Rosenfellner | |
| 2001/0027701 | A1 | 10/2001 | Ito et al. | |
| 2001/0030389 | A1 | 10/2001 | Kamikawa et al. | |
| 2001/0049980 | A1 | 12/2001 | Negami et al. | |
| 2002/0003324 | A1 | 1/2002 | Kamikawa et al. | |
| 2003/0097908 | A1 | 5/2003 | Hoffman et al. | |
| 2003/0110889 | A1 | 6/2003 | Uenosono et al. | |
| 2003/0150295 | A1 | 8/2003 | Demir | |
| 2004/0168550 | A1 | 9/2004 | Tsuge et al. | |
| 2004/0173054 | A1 * | 9/2004 | Tsuge et al. | 75/485 |
| 2004/0177721 | A1 | 9/2004 | Halpin et al. | |
| 2004/0261577 | A1 | 12/2004 | Bratina et al. | |
| 2005/0083988 | A1 | 4/2005 | Schaefer | |
| 2005/0103157 | A1 | 5/2005 | Kruesi et al. | |
| 2005/0127581 | A1 | 6/2005 | Leigh | |
| 2005/0145068 | A1 | 7/2005 | Hu et al. | |
| 2005/0193862 | A1 | 9/2005 | Suzuki et al. | |
| 2005/0279188 | A1 | 12/2005 | Derderian | |
| 2006/0070495 | A1 | 4/2006 | Ito et al. | |
| 2006/0143977 | A1 | 7/2006 | Meijer et al. | |
| 2006/0150772 | A1 | 7/2006 | Iwasaki et al. | |
| 2006/0150773 | A1 | 7/2006 | Iwasaki et al. | |
| 2006/0150775 | A1 | 7/2006 | Iwasaki et al. | |
| 2006/0278041 | A1 | 12/2006 | Harada et al. | |
| 2007/0051203 | A1 | 3/2007 | Ishiwata et al. | |
| 2007/0227301 | A1 | 10/2007 | Ito et al. | |
| 2008/0011126 | A1 | 1/2008 | Duarte et al. | |
| 2008/0087135 | A1 | 4/2008 | Hwang et al. | |
| 2009/0025511 | A1 | 1/2009 | Negami et al. | |
| 2009/0051083 | A1 | 2/2009 | Vrech et al. | |
| 2010/0224028 | A1 * | 9/2010 | Tsutsumi et al. | 75/484 |

FOREIGN PATENT DOCUMENTS

| | | | |
|---|---|---|---|
| AU | B-56288/94 | | 6/1994 |
| AU | 199536281 | B2 | 3/1996 |
| AU | B-17005/95 | | 6/1996 |
| AU | 199643795 | B2 | 8/1996 |
| AU | 199711910 | B2 | 7/1997 |
| AU | 199876453 | B2 | 11/1998 |
| AU | 199868926 | B2 | 2/1999 |
| AU | 200011098 | B2 | 3/2001 |
| AU | 2002301887 | B9 | 6/2003 |
| AU | 2004292928 | B2 | 6/2005 |
| AU | 2005263068 | B2 | 1/2006 |
| CA | 1 244 656 | | 11/1988 |
| CA | 2 501 262 | A1 | 4/2004 |
| CN | 85108811 | | 5/1986 |
| CN | 1061043 | | 5/1992 |
| CN | 2196545 | Y | 5/1995 |
| CN | 1107893 | A | 9/1995 |
| CN | 1288485 | A | 3/2001 |
| CN | 1557973 | A | 12/2004 |
| CN | 1738997 | A | 2/2006 |
| CN | 1271221 | C | 8/2006 |
| CN | 100352948 | C | 12/2007 |
| CN | 100408955 | C | 8/2008 |
| CN | 101240359 | A | 8/2008 |
| CN | 101343692 | A | 1/2009 |
| CN | 100457924 | C | 2/2009 |
| EP | 0 184 405 | A2 | 6/1986 |
| EP | 0184405 | | 6/1986 |
| EP | 0 184 405 | B1 | 5/1990 |
| EP | 0 259 510 | B1 | 1/1991 |
| EP | 0 578 628 | A1 | 1/1994 |
| EP | 0 807 187 | B1 | 8/1998 |
| EP | 0 796 349 | B1 | 11/1998 |
| EP | 0 865 505 61 | | 5/1999 |
| EP | 0 783 591 | B1 | 4/2001 |
| EP | 0 882 141 | B1 | 6/2002 |
| EP | 1 217 318 | A1 | 6/2002 |
| EP | 1 021 569 | B1 | 7/2002 |
| EP | 1 165 845 | B1 | 2/2006 |
| EP | 1 546 419 | B1 | 5/2007 |
| EP | 1 338 660 | B1 | 5/2009 |
| EP | 1 784 514 | B1 | 9/2009 |
| GB | 2302167 | B | 4/1998 |

| | | | |
|---|---|---|---|
| JP | 61133330 | | 6/1986 |
| JP | 06-116616 | | 4/1994 |
| JP | 6166415 | | 6/1994 |
| JP | 10204515 | | 8/1998 |
| JP | 1129806 | | 2/1999 |
| JP | 11263978 | | 9/1999 |
| JP | 2000-034526 | | 2/2000 |
| JP | 2000-096155 | | 4/2000 |
| JP | 2000-129326 | | 5/2000 |
| JP | 2001-064710 | | 3/2001 |
| JP | 3208385 | | 9/2001 |
| JP | 2002-047507 | | 2/2002 |
| JP | 3280435 | | 5/2002 |
| JP | 2002-241821 | | 8/2002 |
| JP | 2003-89812 | | 3/2003 |
| JP | 2003-90686 | | 3/2003 |
| JP | 3396434 | | 4/2003 |
| JP | 3439059 | | 8/2003 |
| JP | 2004-52002 | | 2/2004 |
| JP | 2004-218019 | | 8/2004 |
| JP | 3635255 | | 4/2005 |
| JP | 2005-127682 | | 5/2005 |
| JP | 2005-248196 | | 9/2005 |
| JP | 3721993 | | 11/2005 |
| JP | 2006-22408 | | 1/2006 |
| JP | 3735016 | | 1/2006 |
| JP | 3749710 | | 3/2006 |
| JP | 2006-104501 | | 4/2006 |
| JP | 2006-316333 | | 11/2006 |
| JP | 2007-197783 | | 8/2007 |
| JP | 4220988 | | 2/2009 |
| WO | WO 94/12672 | | 6/1994 |
| WO | WO 96/08585 | | 3/1996 |
| WO | WO 96/17090 | | 6/1996 |
| WO | WO 97/04136 | | 2/1997 |
| WO | WO 97/26375 | | 7/1997 |
| WO | WO 97/46722 | | 12/1997 |
| WO | WO 97/49835 | | 12/1997 |
| WO | WO 98/48056 | | 10/1998 |
| WO | WO 98/48057 | | 10/1998 |
| WO | WO 99/06600 | | 2/1999 |
| WO | WO 00/50649 | | 8/2000 |
| WO | WO 00/53818 | | 9/2000 |
| WO | WO 01/14598 | A1 | 3/2001 |
| WO | WO 01/23627 | A1 | 4/2001 |
| WO | WO 2004/048621 | A1 | 6/2004 |
| WO | WO 2004/083467 | A2 | 9/2004 |
| WO | WO 2004/101832 | A2 | 11/2004 |
| WO | WO 2005/051105 | A1 | 6/2005 |
| WO | WO 2006/006820 | A1 | 1/2006 |
| WO | WO 2006/043770 | A1 | 4/2006 |
| WO | WO 2006/089358 | A1 | 8/2006 |
| WO | WO 2006/111574 | A1 | 10/2006 |
| WO | WO 2006/133500 | A1 | 12/2006 |

OTHER PUBLICATIONS

Haque, R. et al., "Reduction of iron ore fines by coal fines in a packed bed and fluidized bed apparatus—A comparative study," Metallurgical and Materials Transactions B, vol. 24, No. 3, Jun. 1993, pp. 511-520 (10 pages).

Haque, R. et al., "Role of ore/carbon contact and direct reduction in the reduction of iron oxide by carbon," Metallurgical and Materials Transactions B, vol. 26, No. 2, Apr. 1995, pp. 400-401 (2 pages).

Joo, S. et al., "FINEX®: a new process for production of hot metal from fine ore and coal," Scandinavian Journal of Metallurgy, vol. 28, 1999, pp. 178-183, Denmark (6 pages).

Munnix, R. et al., "Development of the COMET process for the production of high quality DRI from iron ore and coal fines," http://www.crm-eur.com/F-PUBLICATIONS/media/18f_Trinidad.pdf, visited Jan. 23, 2011 (8 pages).

Ji, S. et al., "Semisolid Processing Characteristics of AM Series Mg Alloys by Rheo-Diecasting," Metallurgical and Materials Transactions A, vol. 37A, Mar. 2006, pp. 779-787 (9 pages).

Lucena, R. et al., "The Orinoco Iron FINMET® Plant Operation," Nov. 2006, STAHL 2006 Crossing Frontiers, Düsseldorf, Germany (17 pages).

Yamamoto, Tetsuya et al., "Reduction Behavior of the Mixture of Iron Ore and Carbonaceous Material at High Temperatures," The Iron and Steel Institute of Japan (ISIJ), Tetsu-to-Hagané, vol. 87, No. 12, 2001, pp. 8-14 (7 pages).

Ferrowest Limited. ASX Announcement, ITmk3® Technology a Step Closer to Commercialisation, Jun. 20, 2007 (1 page).

Kobe Steel, Ltd., "Kobe Steel forms alliance with Cleveland-Cliffs to promote ITmk3® ironmaking technology," Jun. 20, 2007, http://www.kobelco.co.jp/english/topics/2007/06/1178520_5666.html. visited Jun. 20, 2007 (2 pages).

Pei, Zhao et al., "New Technology of Producing Titanium Slag by Reducing Ilmenite at Low Temperature," Iron Steel Vanadium Titanium, vol. 26, No. 2, Jun. 2005 (4 pages).

Znang, Jun-Hui et al., "Research on the Technological Flowsheets for Iron Separation from a low-grade Vanadiferous Titanomagnefite Ore," Multipurpose Utilization of Mineral Resources. No. 6, Dec. 2008 (3 pages).

Guo, Wei et al., "Present Status and Development Trends of World Direct Reduction Processes," Sep. 2004 (5 pages).

Xingya, Ma et al. "The Present State of Study on Reduction Technique of Carbon-Bearing Pellets," Sinterizing and Pelletizing, 1999, pp. 27-30 (4 pages).

Peimin, Guo et al., "Characteristics of and theoretical study on new low-temperature quick reduction iron-making technology," Ironmaking, vol. 26, No. 1, Feb. 2007, pp. 57-60 (5 pages).

Wenge, Liang, "Present Status and Development of Coal Based Tunnel Kiln Direct Reduced Iron Production in China," Special Steel, vol. 20, No. 3, Jun. 1999, pp. 30-34 (5 pages).

Hongfeng, Deng. "Impact of iron-making process Innovation on the development of iron & steel industry," 2008, pp. 35-38 (5 pages).

International Search Report mailed Jan. 6, 2011, in International Application No. PCT/IB2010/001709 (5 pages).

Written Opinion of the International Searching Authority mailed Jan. 6, 2011, in International Application No. PCT/IB2010/001709 (6 pages).

International Search Report mailed Jan. 6, 2011, in International Application No. PCT/IB2010/001826 (7 pages).

Written Opinion of the International Searching Authority mailed Jan. 6, 2011, in International Application No. PCT/IB2010/001826 (8 pages).

U.S. Appl. No. 12/824,622, filed Jun. 28, 2010, with Applicant Bairong Li.

Shouming, Chen, "X00317 PF-method shaft furnace coal-based direct reduction process passing semi-industrial test,"Special Steel, 2000, vol. 21. p. 60 (2 pages).

Metallurgy, 2006, No. 4, pp. 46-48 (3 pages).

* cited by examiner

METAL REDUCTION PROCESSES, METALLURGICAL PROCESSES AND PRODUCTS AND APPARATUS

CROSS-REFERENCE TO RELATED APPLICATION

This application claims the benefit of U.S. Provisional Patent Application No. 61/213,645, filed Jun. 29, 2009, entitled "METAL REDUCTION PROCESSES, METALLURGICAL PROCESSES AND PRODUCTS AND APPARATUS," which is hereby incorporated by reference in its entirety.

FIELD OF THE INVENTION

This disclosure relates to the field of metal reduction and metallurgy, specifically to metal reduction processes, metallurgical processes, and to related products and to apparatus for use therewith.

BACKGROUND OF THE INVENTION

Metals are indispensable material for human beings. They normally do not exist as simple substances, i.e., zero-valent metals, in nature; most are found, for example, in ores as compounds and mixtures. To obtain metals in simple substance form, ores need to be smelted to extract the metals.

Many methods to extract metals exist, one of which is to reduce ores at an appropriate temperature using a reducing agent. Taking iron extraction as an example, the traditional method includes the blast furnace method. Other commonly used metallurgical methods for iron reduction include, for example, direct reduction and melt reduction. Direct iron reduction falls primarily into two categories: (1) gas-based direct reduction, including, for example, the Midrex shaft kiln method and the HYL reaction tank method; and (2) coal-based direct reduction, including, for example, the Fastmet method using a ring back converter, the CRIMM method using a rotary kiln, the Fastmelt method, and the ITmk3 method. Most of those methods usually require a high concentration of iron, such as over 60% of iron, in the ores. Another coal-based direct reduction method uses tunnel kilns and the reactant materials are in a powder form before entering into the tunnel kiln. Melt reduction methods include, for example the Corex method, the Hismelt method, the Finex Method, and others such as the DIOS, AISI, and CCF methods. Another commonly-used method is the Hoganas method.

These above-mentioned methods, in general, may require high energy consumption, create serious air pollution, or require significant investments for equipment. In addition, these methods may have stringent demand for high-quality feed material, such as requiring high metal-content ores, or requires stringent control during the processing to avoid poor-quality products. Hence, there is still a great need for a new metal reduction process to solve at least one of the problems set forth above.

SUMMARY OF THE INVENTION

The present disclosure relates to a metal reduction process, comprising:

- adding a mixture into a reactor, wherein the mixture comprises at least one metal-containing material, at least one reducing agent, and at least one additive,
- heating the reactor to a selected reduction temperature,

- moving the mixture through the reactor while stirring the mixture, allowing a reduction period to occur, and
- obtaining a resulting composition, wherein the resulting composition comprises at least one zero-valent metal and a residue. The resulting composition may, for example, be in the form of solid particles comprising at least one zero-valent metal core and a coating.

The present disclosure further relates to a metallurgical process, comprising

- a mixing stage, comprising mixing at least one metal-containing material, at least one reducing agent, and at least one additive to form a mixture;
- a metal reduction stage, comprising adding the mixture into a reactor, heating the reactor to a selected reduction temperature, moving the mixture through the reactor while stirring the mixture, allowing a reduction period to occur, and obtaining a resulting composition, wherein the resulting composition comprises at least one zero-valent metal and a residue; and
- a separation stage, wherein the at least one zero-valent metal is separated from the residue.

The present disclosure also relates to a product, made by the metal reduction process set forth above, wherein the resulting composition is in the form of solid particles comprising at least one zero-valent metal core and a coating. The resulting composition may, for example, be in the form of solid particles comprising at least one zero-valent metal core and a coating.

The present disclosure further relates to a metal reduction apparatus for recovering at least one metal from at least one metal-containing material, comprising:

- a reactor housing configured to receive a mixture of at least one metal-containing material, at least one reducing agent, and at least one additive;
- a heating device including at least one heating unit thermally coupled to the reactor housing; and
- a propelling blender located in the reactor housing, wherein:
  - the propelling blender includes a plurality of shafts;
  - each of the plurality of shafts has at least one blade; and
  - the thickness of an outer surface of the at least one blade varies along the arc of the at least one blade.

The present disclosure also relates to a metal reduction system, comprising:

- a metal reduction apparatus including
  - a reactor housing configured to receive a mixture of at least one metal-containing material, at least one reducing agent, and at least one additive;
  - a heating device including at least one heating unit thermally coupled to the reactor housing, and at least one temperature controlling unit controllably coupled to the at least one heating unit; and
- a propelling blender located in the reactor housing; and
- at least one heat recovery device coupled to the metal reduction apparatus, and configured to receive a resulting composition discharged from the metal reduction apparatus.

The present disclosure further relates to a metallurgical system for recovering at least one metal from at least one metal-containing material, comprising:

- a material preparation system configured to prepare a mixture of the at least one metal-containing material, at least one reducing agent, and at least one additive;
- a metal reduction apparatus located downstream of the material preparation system, and configured to reduce the at least one metal-containing material to a resulting composition comprising at least one zero-valent metal and a residue, the metal reduction apparatus including:
a heating device, and
a propelling blender; and
a separator located downstream of the metal reduction apparatus, and configured to separate the at least one zero-valent metal from the residue.

DETAILED DESCRIPTION OF THE INVENTION

Figure 1:
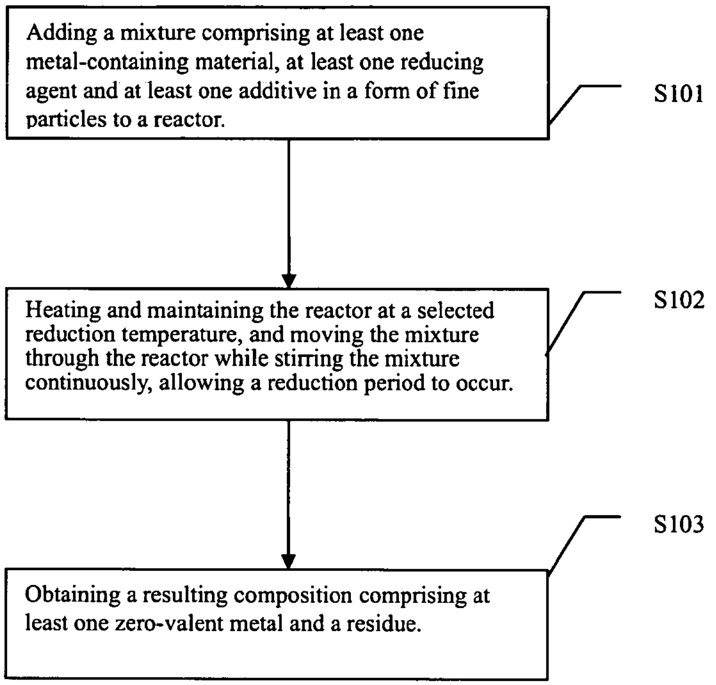
FIG. 1 is a flowchart for an exemplary metal reduction process in accordance with the present disclosure.

The present disclosure relates to a metal reduction process, comprising:
adding a mixture into a reactor, wherein the mixture comprises at least one metal-containing material, at least one reducing agent, and at least one additive,
heating the reactor to a selected reduction temperature,
moving the mixture through the reactor while stirring the mixture, allowing a reduction period to occur, and
obtaining a resulting composition, wherein the resulting composition comprises at least one zero-valent metal and a residue.

In one embodiment, the mixture is in the form of fine particles. For example, the fine particles can have a particle size of less than about 1 mm. As another example, the fine particles have a particle size of less than about 0.074 mm. The particle size may be measured by a method known in the art, chosen, for example, from laser density methods, settlement and precipitation methods, and electron microscopy methods.

The at least one metal-containing material disclosed herein may be chosen from ores, slag, industrial wastes, and metal oxides. In one embodiment, the at least one metal-containing material is chosen from ores. The ores include, but are not limited to, low grade ores, symbiotic ores, and refractory ores. For example, the at least one metal-containing material can be chosen from low grade ores. The phrase "low grade ores" as used herein refers to ores containing a lower amount of metal than the grade required by prior art technologies. For example, lower grade iron ores contain no higher than 60% by weight of iron, such as 20%-60% by weight of iron, relative to the total weight of the ores. In another embodiment, the at least one metal-containing material is chosen from industrial wastes.

More than one metal-containing material may be used in a single metal reduction process. For example, more than one industrial waste containing iron, albeit from different sources or with different specifications, may be combined and reduced in a single metal reduction process.

In one embodiment, the at least one metal-containing material comprises at least one metal compound. The at least one metal compound may be chosen, for example, from compounds containing at least one positive-valent metal. For example, the at least one metal compound can be chosen from metal oxides, metal carbonates and metal hydroxides. As another example, the at least one metal compound is chosen from metal sulfides, which may be transformed into metal oxides via a method known in the art before being subject to a metal reduction process. When more than one metal-containing compound is used, the at least one metal-containing compound may contain the same metal or different metals. For example, a metal-containing material may contain $Fe_3O_4$, $Fe_2O_3$, FeO, and/or any combination thereof. As another example, metal compounds containing oxides and/or sulfides of Fe and/or Ni may coexist in one metal-containing material.

The at least one reducing agent may be any reducing agent that could achieve metal reduction, and may be chosen, for example, from materials having a high carbon content. In one embodiment, the at least one reducing agent is chosen from coals, anthracites, cokes, heavy oils, petrol-coke, and pitch. For example, the at least one reducing agent can be chosen from coals, and anthracites, and cokes.

The at least one reducing agent disclosed herein may be present in the mixture in an amount greater than the theoretical molar value. In one embodiment, the at least one reducing agent is present in an amount ranging from about 5% to about 100% greater than the theoretical molar value. The phrase "the theoretical molar value" of the at least one reducing agent as used herein is the calculated amount of the at least one reducing agent, an amount that would be required for the metal reduction reaction to be complete in accordance with the applicable chemical reaction equation, under an ideal chemical reaction condition, based on an estimated amount of the metal(s) contained in the at least one metal-containing material. For example, if a material containing $Fe_3O_4$ is to be reduced by coal, the following chemical reaction would occur: $Fe_3O_4+2\ C=3\ Fe+2\ CO_2$. Under ideal chemical reaction conditions, to make the reduction reaction of 1 mole of $Fe_3O_4$ complete, 2 moles of carbon would be required. That is, the theoretical molar value for reducing 1 mole of $Fe_3O_4$ is 2 moles of carbon. In practice, the theoretical molar value of a reducing agent is calculated based on the estimated amount of the metal(s) contained in a metal-containing material.

The at least one additive disclosed herein may be used for various purposes, for example, to remove any unwanted matter. For example, sulfur and/or phosphorus may be removed from the at least one metal-containing material by using the at least one additive. In one embodiment, the at least one additive is chosen from compounds containing at least one cation chosen from $Li^+$, $Na^+$, $K^+$, $Ca^{2+}$, $Sr^{2+}$, $Ba^{2+}$, and $Mg^{2+}$. For example, the at least one additive can be chosen from LiCl, NaCl, KCl, $CaCl_2$, $SrCl_2$, $BaCl_2$, $MgCl_2$, LiF, NaF, KF, $CaF_2$, $SrF_2$, $BaF_2$, $MgF_2$, $Li_2O$, $Na_2O$, $K_2O$, CaO, SrO, BaO, MgO, $LiHCO_3$, $NaHCO_3$, $KHCO_3$, $Ca(HCO_3)_2$, $Sr(HCO_3)_2$, $Ba(HCO_3)_2$, $Mg(HCO_3)_2$, $Li_2SO_4$, $Na_2SO_4$, $K_2SO_4$, $CaSO_4$, $SrSO_4$, $BaSO_4$, $MgSO_4$, $Li_2CO_3$, $Na_2CO_3$, $K_2CO_3$, $CaCO_3$, $SrCO_3$, $BaCO_3$, and $MgCO_3$. Further, for example, the at least one additive can be chosen from NaCl, KCl, $CaCl_2$, NaF, $CaF_2$, $SrF_2$, $Na_2O$, CaO, MgO, $NaHCO_3$, $KHCO_3$, $Ca(HCO_3)_2$, $CaSO_4$, $BaSO_4$, $MgSO_4$, $Na_2CO_3$, $K_2CO_3$, and $CaCO_3$. In one embodiment, the at least one additive is chosen from NaCl, KCl, NaF, $CaF_2$, $SrF_2$, CaO, MgO, $NaHCO_3$, $Ca(HCO_3)_2$, $BaSO_4$, $MgSO_4$, $Na_2CO_3$, $K_2CO_3$, and $CaCO_3$.

The amount of the at least one additive in the mixture may be determined based on various factors, depending on the purpose of the additive. For example, if sulfur is to be removed during the metal reduction process, the amount of the at least one additive is determined based on factors such as the content of sulfur and the nature of the metal in the metal-containing material. The presence of the at least one additive may also, for example, help maintain an environment inside of the reactor to facilitate the reduction reaction. In one embodiment, the at least one additive is present in the mixture in an amount greater than the theoretical molar value. For example, the at least one additive is present in the mixture in an amount about 5% to about 100% greater than the theoretical molar value. The phrase "the theoretical molar value" of the at least one additive refers to the calculated amount of the at least one additive, which would be required, under ideal chemical reaction conditions, to remove the unwanted matter from the at least one metal-containing material, based on an estimated amount of the unwanted matter. The theoretical molar value of an additive may be calculated in a similar fashion as exemplified above for the at least one reducing agent, based on the nature of the unwanted matter.

The ratio of the at least one additive and the at least one reducing agent may be adjusted based on factors such as the quality of the at least one metal-containing material, the nature of the metal in the metal-containing material, and/or the purpose of the at least one additive. In one embodiment, the weight ratio of the at least one additive and the at least one reducing agent is about 1:1. This weight ratio may also, for example, vary to ensure that the environment inside of the reactor that is desirable for the reduction reaction could be maintained.

The reactor may be preheated before the mixture is added into the reactor, or heated after the mixture is added, or heated simultaneously as the mixture is added into the reactor. In one embodiment, the selected reduction temperature is maintained throughout the metal reduction process. "Maintained" as used herein means that the temperature of the reactor is kept roughly at the selected reduction temperature. For example, when the mixture, which may be at a lower temperature than the selected reduction temperature, is added into the reactor, it may cause a decrease of the reactor's temperature. As another example, at the end of the reaction in the reactor, i.e., when the resulting composition goes out of the reactor, the temperature of the reactor may be higher than the selected reduction temperature. The mixture could also, for example, be heated to the selected reduction temperature before being added into the reactor.

The temperature of the reactor may be controlled according to timing. For example, the timing controlled temperature may include a preheating, heating, and cooling cycle. In one embodiment, the reactor is preheated for a selected preheating time period, before being heated to a selected reduction temperature. Then, the temperature of the reactor is maintained at a selected reduction temperature for a selected reduction time period; and then the reactor is cooled for a selected cooling time period to cool the resulting composition to a desired temperature. During this cycle, different sections of the reactor might, for example, be at a different temperature. In one embodiment, at one time, the inlet of the reactor may be at a preheating temperature, the middle may be at a selected reduction temperature, and the outlet may be at a cooling temperature. In another embodiment, at one time, the temperature of the reactor is maintained at a selected reduction temperature.

Selection of the reduction temperature depends on various factors, such as the nature of the metal in the metal-containing material and/or the particle size of the grounded metal-containing material. In one embodiment, the selected reduction temperature is not lower than 500° C. For example, the selected reduction temperature can range from about 800° C. to about 1200° C. In another embodiment, the selected reduction temperature ranges from about 1000° C. to about 1050° C.

The at least one zero-valent metal may be chosen from magnetic metals and non-magnetic metals, such as cobalt, copper, iron, lead, nickel, tin, tungsten, and zinc. In one embodiment, the at least one zero-valent metal is chosen from iron, nickel, and tin. For example, the at least one zero-valent metal can be chosen from nickel and tin. In another embodiment, the at least one zero-valent metal is iron.

The metal reduction process disclosed herein can be used to extract more than one type of metal simultaneously, or sequentially, from the metal-containing material, depending on the type of the metal-containing material and/or the nature of the metal. For example, if the metal-containing material contains two types of metals, and if the two types of metals can be extracted under similar conditions, such as similar reduction temperature, the two types of metals may accordingly be simultaneously extracted from the metal-containing material. As another example, if the metal-containing material contains two types of metals, but the two types of metals ordinarily cannot be reduced under similar conditions, one metal may be reduced first, and the residue may be recovered and subject to another round of the metal reduction process as disclosed herein.

The selection of a reduction period depends on various factors, such as the nature of the metal in the metal-containing material, the selected reducing agent, and/or the particle size of the grounded metal-containing material. In one embodiment, the reduction period is not shorter than 20 minutes. For example, the reduction period can range from about 60 minutes to about 150 minutes.

In one embodiment, the moving of the mixture through the reactor while stirring the mixture is achieved by propelling and mixing the mixture inside the reactor using, for example, the metal reduction apparatus disclosed herein. For example, the mixture may be stirred continuously. Alternatively, the mixture may be stirred intermittently.

In one embodiment, as the reactor is filled with the mixture including, for example, the at least one metal-containing material, oxygen is depleted inside of the reactor during the movement of the mixture through the reactor. "Depleted" as used herein means that substantially no $O_2$ remains present in the reactor. For example, the depletion of $O_2$ may be achieved through means that seal the reactor and thus prevent $O_2$ from getting inside the reactor. Nevertheless, a trace amount of $O_2$ may be brought in when the mixture is added into the reactor. The level of the $O_2$ present within the sealed reactor may be further depleted after the $O_2$ is reacted with a reducing agent present in the mixture. An oxygen-depleted environment is desirable for metal reduction processes and could increase the reduction reaction rate and/or make the reduction reaction more complete.

The resulting composition disclosed herein comprises at least one zero-valent metal and a residue. The residue can include, for example, any unreacted additive, unreacted reducing agent, unreacted metal-containing material, by-products of the absorbed waste gas(es) that are produced during the metal reduction process, and by-products of the reaction of the metal-containing material with the additive and the reducing agent.

The at least one zero-valent metal may be in the form of metal cores, and the residue may be, in full or in part, in the form of a coating, which partially or completely covers the at least one zero-valent metal core and can be removed by, for example, grinding.

Accordingly, the resulting composition may be in the form of solid particles, which comprise the metal cores and the coatings thereof. The phrase “solid particles” as used herein means particles without holes inside. Solid particles are different from sponge particles, which have holes inside. As another example, the solid particles in the resulting composition may exist in agglomerated form. In one embodiment, the solid particles have a particle size of no greater than about 10 mm. In another embodiment, the solid particles have a particle size no greater than about 1 mm.

The metal reduction process disclosed herein may further comprise grinding the at least one metal-containing material, at least one reducing agent, and at least one additive separately into the form of fine particles and mixing them together before adding the mixture into the reactor. Alternatively, the metal reduction process disclosed herein may further comprise grinding the at least one metal-containing material, at least one reducing agent, and at least one additive together to form the mixture in the form of fine particles before adding the mixture into the reactor. When the at least one metal-containing material is chosen from ores, the grinding depends on, for example, the embedded particle size of the metal compounds in the ores. One of the main purposes of the grinding includes, for example, to expose the metal component of the metal-containing material. To this end, a pre-grinding process may be used, including crushing, to obtain an appropriate size of ores to be used in a grinder.

To further describe the metal reduction process disclosed herein, certain embodiments are, in part, presented in the Figures, e.g., FIG. 1. S101 of FIG. 1 represents a step of adding a mixture comprising at least one metal-containing material, at least one reducing agent and at least one additive in the form of fine particles to a reactor. The mixture is ground into particles having a particle size of less than about 1 mm, to increase the reaction rate of the metal reduction.

S102 of FIG. 1 represents a step of heating and maintaining the reactor at a selected reduction temperature, and moving the mixture through the reactor while stirring the mixture continuously, allowing a reduction period to occur. Depending on the type of the metal to be obtained, the reactor is heated to a temperature suitable for the metal reduction to occur. An appropriately selected reduction temperature and the stirring of the mixture both could facilitate the efficiency of the reduction reaction.

S103 of FIG. 1 represents a step of obtaining a resulting composition, which comprises at least one zero-valent metal and a residue, being formed following a reduction period. The resulting zero-valent metal can be further made into metal products. The residue may be further treated, for example, for use as a cement admixture.

The reduction temperature and reduction period are controllable in the metal reduction process disclosed herein. For example, if a hematite is to be reduced, a reduction temperature of about 1000° C. to about 1050° C., and a reduction period of about 60 minutes to about 150 minutes, may be selected. For another example, if an awaruite is to be reduced, a reduction temperature of about 950° C. to about 1100° C., and a reduction period of about 60 minutes to about 120 minutes, may be selected.

The present disclosure further relates to a metallurgical process, comprising:

- a mixing stage, comprising mixing at least one metal-containing material, at least one reducing agent, and at least one additive to form a mixture;
- a metal reduction stage, comprising adding the mixture into a reactor, heating the reactor to a selected reduction temperature, moving the mixture through the reactor while stirring the mixture, allowing a reduction period to occur, and obtaining a resulting composition, wherein the resulting composition comprises at least one zero-valent metal and a residue; and
- a separation stage, wherein the at least one zero-valent metal is separated from the residue.

The mixing stage disclosed herein may, for example, comprise adding the at least one additive and the at least one reducing agent to the at least one metal-containing material to form a mixture, and grinding the mixture into a form of fine particles. The ground mixture of the metal-containing material, the at least one reducing agent, and the at least one additive may contain water. Thus, the metallurgical process may, for example, further comprise a drying step. The mixture may be dried by at least one heat conductive medium that is commonly used in the art. For example, the at least one heat conductive medium can be chosen from heat-conductive oils, water, and gas.

Alternatively, the metallurgical process may, for example, further comprise grinding the at least one metal-containing material, the at least one reducing agent, and the at least one additive separately into the form of fine particles prior to forming a mixture. The at least one metal-containing material, the at least one reducing agent, and/or the at least one additive may contain water. Thus, the metallurgical process may, for example, further comprise drying the at least one metal-containing material, the at least one reducing agent, and/or the at least one additive separately after the grinding step. In an alternative embodiment, after the grinding step, the ground at least one additive, the ground at least one reducing agent, and the ground at least one metal-containing material may be mixed together, in appropriate proportions, to form a ground mixture. The ground mixture may then be dried at least once to reach a desired water content prior to entry into the reactor.

The metal reduction stage disclosed herein is similar to the metal reduction process set forth above. It is understandable that one or more metal reduction process may be carried out simultaneously in one or more reactors.

The metallurgical process disclosed herein may further comprise, for example, a grinding step after the direct reduction stage, wherein the resulting composition is ground. The grinding step may serve to disassociate the zero-valent metal and a covering of the zero-valent metal that is formed during the metal reduction stage. In one embodiment, a wet grinding method is used to grind the resulting composition. Any liquid that can serve the purpose for wet grinding may be used. For example, water or an appropriate aqueous solution or suspension comprising, e.g., the at least one additive, may be used for wet grinding. The amount of the liquid used for wet grinding may be selected based on various factors, such as the amount of the resulting composition that need to be ground. An optimal amount of the liquid may be selected for efficiency purposes. For example, prior to the grinding, the metallurgical process comprises adding water to the resulting composition such that the weight ratio of the resulting composition to the water ranges from about 1:1 to about 4:1. As another example, the weight ratio of the resulting composition to the water is about 7 to about 3.

In an alternative embodiment, a dry grinding method is used to grind the resulting composition such that the at least one zero-valent metal core is disassociated from the covering. For example, the grinding step may last from about 5 minutes to about 40 minutes.

The metallurgical process may further comprise a heat recovery stage, wherein, after the metal reduction stage is completed but before the grinding step, the resulting composition is cooled via at least one heat-conductive medium, and the absorbed heat in the at least one heat-conductive medium is reused for drying at least one material that needs to be dried. The at least one material that needs to be dried may include, for example, the at least one metal-containing material, the at least one reducing agent, the at least one additive, and/or any mixture thereof, before the reduction reaction starts. In one embodiment, the at least one heat-conductive medium is chosen from heat-conductive oils, water, and gas.

The separation stage of the metallurgical process disclosed herein may be conducted using any separation method known in the art. For example, it could be conducted using at least one method chosen from magnetic separation methods, electrostatic separation methods, gravity separation methods, and flotation separation methods. In one embodiment, the at least one zero-valent metal is chosen from magnetic metals, such as iron. The at least one magnetic zero-valent metal may be separated from the residue using, for example, a wet magnetic separation method. In an alternative embodiment, the at least one zero-valent metal is chosen from nonmagnetic metals. In this case, the at least one zero-valent metal may be separated from the residue by using a method known in the art chosen, for example, from gravity separation methods, electrostatic separation methods, and flotation separation methods.

The metallurgical process disclosed herein may further comprise, after the separation stage, a stage for making a metal product, and/or a stage for treating the residue. The stage for making a metal product may comprise, for example, treatment of the at least one zero-valent metal, and formation of a metal product.

The treatment of the at least one zero-valent metal may comprise, for example, at least one step chosen from drying the at least one zero-valent metal, and forming an inert film on the surface of the at least one zero-valent metal. The treatment of the at least one zero-valent metal may further comprise, for example, a dewatering step wherein water is removed from the at least one zero-valent metal. In one embodiment, the dewatering step is conducted using at least one method chosen from strong magnetic dehydration, centrifugation dehydration, vacuum filtration, and pressure filtration. "Drying" as used herein means using heat or a heat conductive medium to remove water from a material. "Dewatering" as used herein means using a device to extract water from a material.

The formation of a metal product may comprise, for example, mixing at least one binder with the at least one zero-valent metal, and briquetting the mixture of the at least one zero-valent metal and the at least one binder to form a metal product. The at least one binder is chosen, for example, from cement clinkers with a specific surface area of higher than about 600 $m^2/kg$. In one embodiment, the at least one binder may be in an amount ranging from about 0.5% to about 5% by weight relative to the total weight of the metal product. For example, the at least one binder can be present in an amount of about 2% by weight relative to the total weight of the metal product.

The stage for treating the residue may comprise, for example, at least one step chosen from dewatering the residue, and drying the residue. The dewatering step may be conducted using at least one method known in the art, chosen, for example, from strong magnetic dehydration, centrifugation dehydration, vacuum filtration, and pressure filtration. The stage for treating the residue may further comprise, for example, grinding the residue, such as for use as a cement admixture.

The metallurgical process disclosed herein may further comprise, for example, recovering the at least one additive following the separation stage. Because the metallurgical process disclosed herein can be continuous, the recovery process of the at least one additive may be continuous and may occur in cycle(s). In one embodiment, the metallurgical process may comprise a wet grinding method using water after the metal reduction stage, wherein the residue after the separation stage is dewatered to yield a solid portion of the residue, and an aqueous portion that comprise all or some of the at least one additive. The aqueous portion may be a solution, and may be in the form of a suspension. The concentration of the at least one additive in the aqueous portion after the dewatering may be adjusted to be close to the saturation concentration of the at least one additive. The at least one additive may be recovered by, for example, drying.

Figure 2:
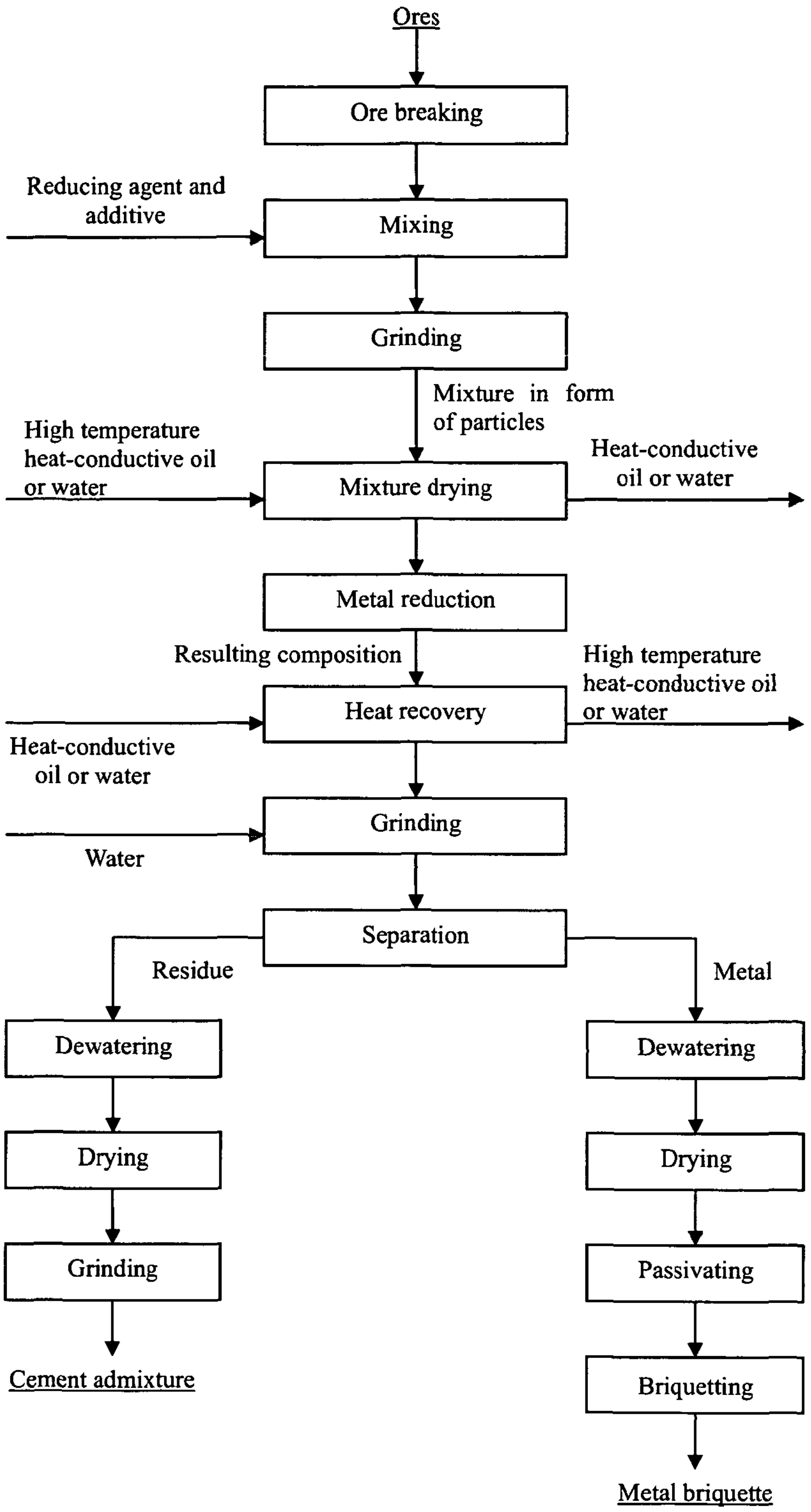
FIG. 2 is a flowchart for an exemplary metallurgical process in accordance with the present disclosure.

The metallurgical process disclosed herein is further described by the embodiment shown in FIG. 2. FIG. 2 is a flowchart of an exemplary metallurgical process in accordance with the present disclosure, including a mixing stage, comprising mixing at least one metal-containing material, at least one reducing agent, and at least one additive to form a mixture; a metal reduction stage, comprising adding the mixture into a reactor, heating the reactor to a selected reduction temperature, moving the mixture through the reactor while stirring the mixture, allowing a reduction period to occur, and obtaining a resulting composition, wherein the resulting composition comprises at least one zero-valent metal and a residue; a separation stage, comprising separating the at least one zero-valent metal from the residue; and a post treatment stage, wherein the at least one zero-valent metal and the residue are treated. In one embodiment, during the metal reduction stage, the reactor is maintained at a selected reduction temperature.

As shown in FIG. 2, before the mixing stage, the metal-containing material may be crushed into particles according to a required specification, for example, to a size as allowed by the grinder, e.g., a mill to be used. In one embodiment, the metal-containing material may be crushed into particles finer than about 3 mm to avoid potential damage to the grinder, e.g., a mill. Then, during the mixing stage, the at least one additive and the at least one reducing agent may be added into the at least one metal-containing material to form a mixture. The mixture may then be ground into the form of fine particles with a particle size of less than 0.074 mm. The mixture may be further dried using a heat-conductive oil or water. The mixture may be thoroughly mixed before being fed into a metal reduction apparatus.

As shown in FIG. 2, between the metal reduction stage and the separation stage, a heat recovery stage and a grinding step may be carried out. The purpose of the heat recovery stage includes, for example, to cool the resulting composition, and transfer the heat to a thermal conducting medium. The recovered heat may then be used to dry the materials that need to be dried. During the grinding step, the resulting composition can be ground using a wet grinding method such that the metal core and the coating thereof are disassociated.

Also shown in FIG. 2, the post-treatment processes may include a stage for making a metal product, and a stage for treating the residue. During the stage for making the metal product, the reduced metal may be dewatered first using, for example, a strong magnetic dehydration method and dried, and then passivated by forming an inert film on the surface of the metal to prevent further oxidation. A binder may then be added to and mixed with the zero-valent metal. Then the metal and the binder may be briquetted to form a metal product of mass. During the stage for treating the residue, the residue may be dewatered, dried and ground to be used as a cement admixture.

The metallurgical process disclosed herein may further comprising recovering the at least one additive after the separation stage. For example, the metallurgical process disclosed herein may further comprise a wet grinding step following the metal reduction stage but before the separation stage, and at least one dewatering step after the separation stage wherein the separated residue is dewatered resulting in a solid portion and an aqueous portion, and the at least one additive is recovered by adjusting the concentration of the at least one additive in the aqueous portion to be close to the saturation concentration of the at least one additive, and drying the aqueous portion.

In another example, the metallurgical process as disclosed herein may further comprises a wet grinding step following the metal reduction stage but before the separation stage, a first dewatering step after the separation stage wherein the residue is dewatered resulting in a solid portion and a first dewatering aqueous portion, at least one washing step wherein the solid portion is washed, and at least one second dewatering step resulting in at least one second dewatering aqueous portion, wherein the at least one additive is recovered by using the first dewatering aqueous portion and the at least one second dewatering aqueous portion in the wet grinding step until the concentration of the at least one additive in the first dewatering aqueous portion or the at least one second dewatering aqueous portion is to be close to the saturation concentration of the at least one additive and drying said first dewatering aqueous portion or the at least one second dewatering aqueous portion.

Figure 3A:
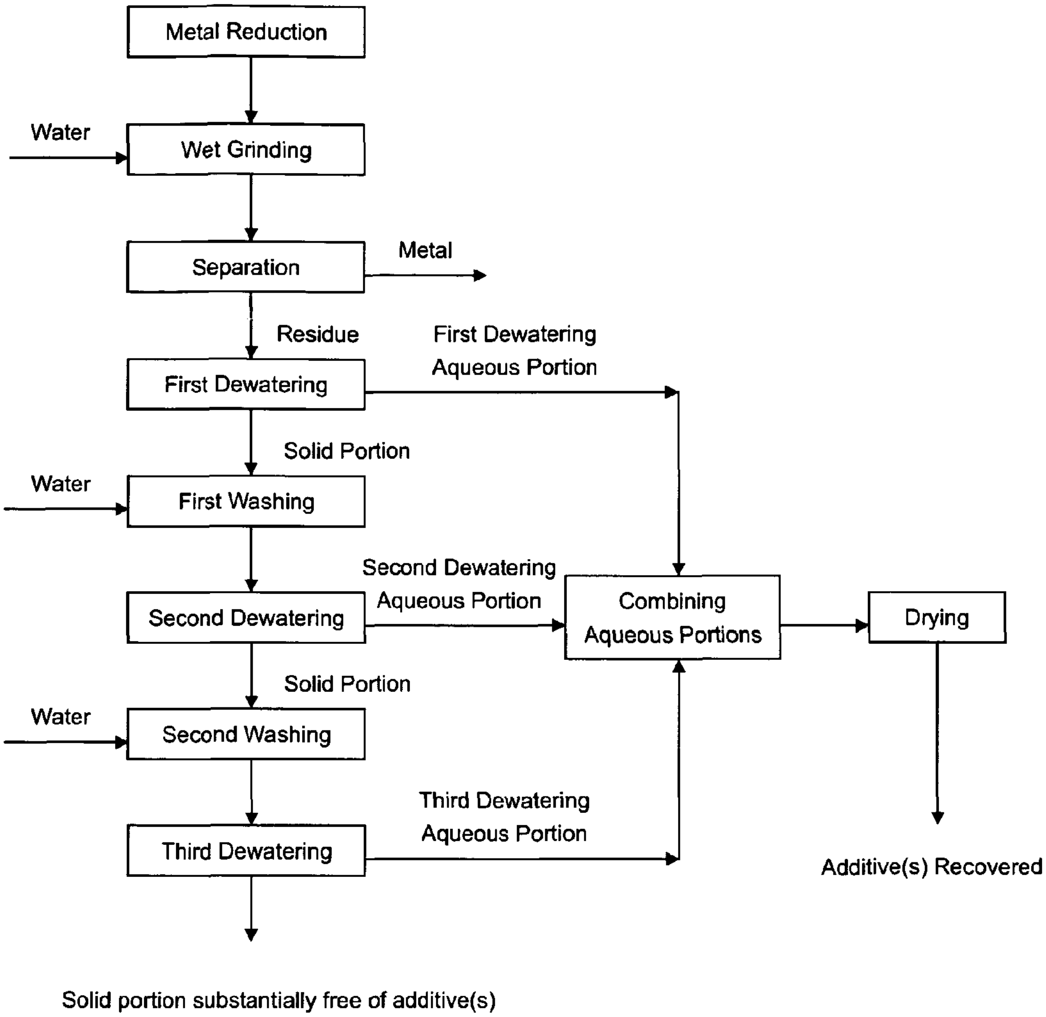
FIGS. 3(A) and (B) are flowcharts for exemplary additive recovery processes in accordance with the present disclosure.

The metallurgical process disclosed herein, as related to recovery of the at least one additive, is further described by the embodiments shown in FIGS. 3(A) and (B). As shown in FIG. 3(A), the metallurgical process may comprise a wet grinding step using water following the metal reduction stage but before the separation stage, a first dewatering step after the separation stage wherein the residue is dewatered resulting in a solid portion of the residue and a first dewatering aqueous portion, a first washing step using water wherein the solid portion is washed, a second dewatering step resulting in a solid portion of the residue and a second dewatering aqueous portion, a second washing step using water wherein the solid portion is washed, and a third dewatering step resulting in a solid portion of the residue, which may be substantially free of the at least one additive and a third dewatering aqueous portion. The aqueous portion after each dewatering step may be in the form of a solution or a suspension. As the metallurgical process can be continuous, the at least one additive can also be recovered continuously by adjusting the at least one additive concentration in the aqueous portion to be close to the saturation concentration of the at least one additive and by drying the combined aqueous portions collected after the dewatering steps. In this embodiment, the first dewatering aqueous portion, the second dewatering aqueous portion, and the third dewatering aqueous portion are combined and the at least one additive concentration in the combined aqueous portion is adjusted to be close to the saturation concentration of the at least one additive by, for example, controlling the amount of water that is added into the wet grinding, the first washing, and the second washing steps.

Figure 3B:
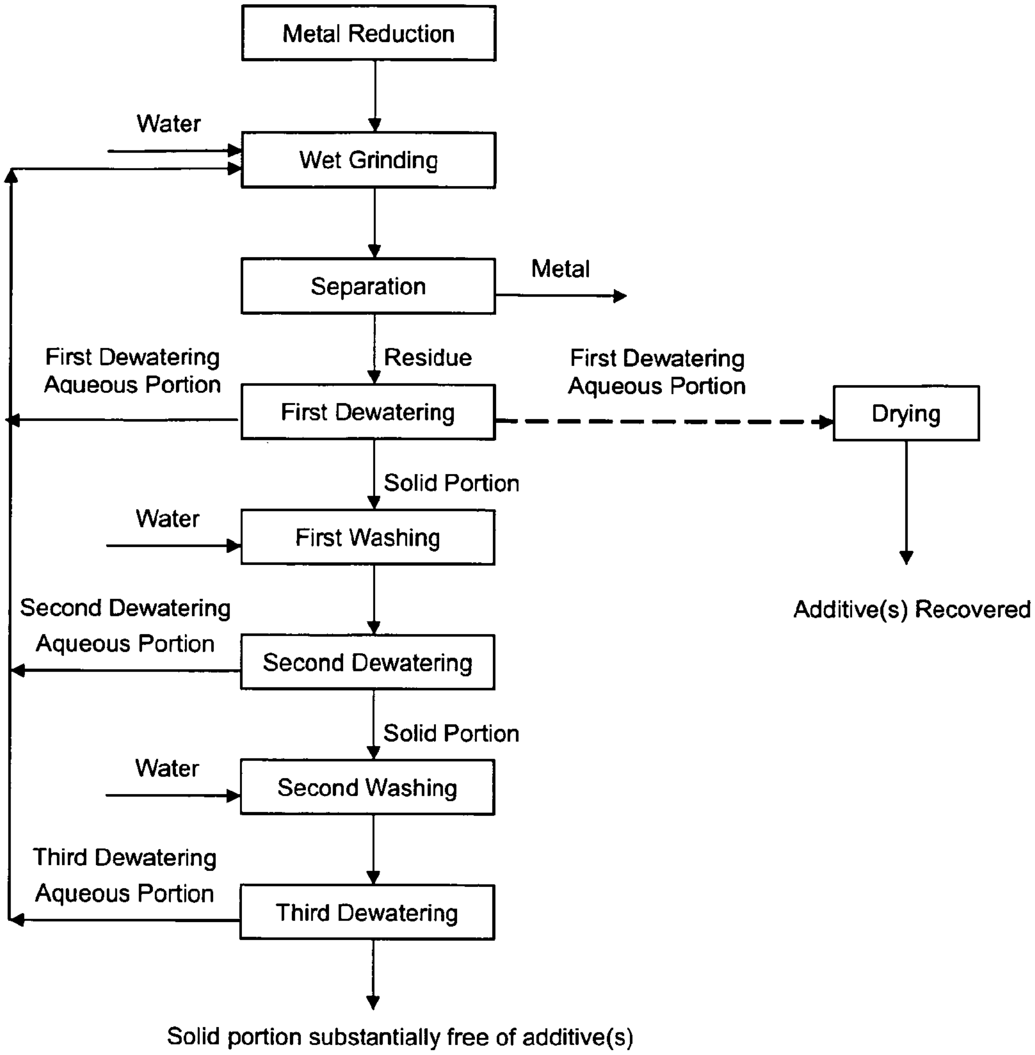

In another embodiment, the at least one additive can be recovered continuously and in a cycle. As shown in FIG. 3(B), the metallurgical process may comprises a wet grinding step using water following the metal reduction stage but before the separation stage, a first dewatering step after the separation stage wherein the residue is dewatered resulting in a solid portion of the residue and a first dewatering aqueous portion, a first washing step using water wherein the solid portion is washed, a second dewatering step resulting in a solid portion of the residue and a second dewatering aqueous portion, a second washing step using water wherein the solid portion is washed, and a third dewatering step resulting in a solid portion of the residue, which may be substantially free of additive(s) and a third dewatering aqueous portion. The aqueous portion after each dewatering step may be in the form of a solution or a suspension. The first dewatering aqueous portion, the second dewatering aqueous portion and the third dewatering aqueous portion could be delivered back to be used in the wet grinding step to form a cycle without addition of water to the wet grinding step, until, for example, the at least one additive concentration in the first dewatering aqueous portion is close to be the saturation concentration of the at least one additive. At that time, that first dewatering aqueous portion is collected and dried to recover the at least one additive. As the metallurgical process can be continuous, the at least one additive can also be recovered continuously by adjusting the at least one additive concentration in the aqueous portion to be close to the saturation concentration of the at least one additive. Such adjustment can be conducted by, for example, controlling the amount of water that is added into the wet grinding, the first washing, and the second washing steps.

It is understandable that, in other embodiments similar to those as shown in FIGS. 3(A) and (B), the washing and dewatering steps after the metal reduction, wet grinding, and separation in the metallurgical process disclosed herein may be operated once or more than once to achieve, for example, at least one of the following purposes: (1) the concentration of the at least one additive in the aqueous portion after the dewatering step could be adjusted to be close to the saturation concentration of the at least one additive so that it is easier to recover the at least one additive by drying; and (2) all or some of the at least one additive in the solid portion of the residue could be removed after the washing and dewatering steps such that the quality of a product made from the solid portion of the residue, e.g., a cement admixture, is not severely adversely affected by some of the at least one additive that may still have been retained.

The steam produced by evaporation can be used for drying those materials that are in need to be dried. The steam can also be condensed, and the resulting water can be reused.

The present disclosure also relates to a product, made by the metal reduction process set forth above, wherein the resulting composition is in the form of solid particles comprising at least one zero-valent metal core and a coating.

In one embodiment, the solid particles have a particle size of no greater than about 10 mm. As another example, the solid particles have a particle size no greater than about 1 mm.

Figure 4:
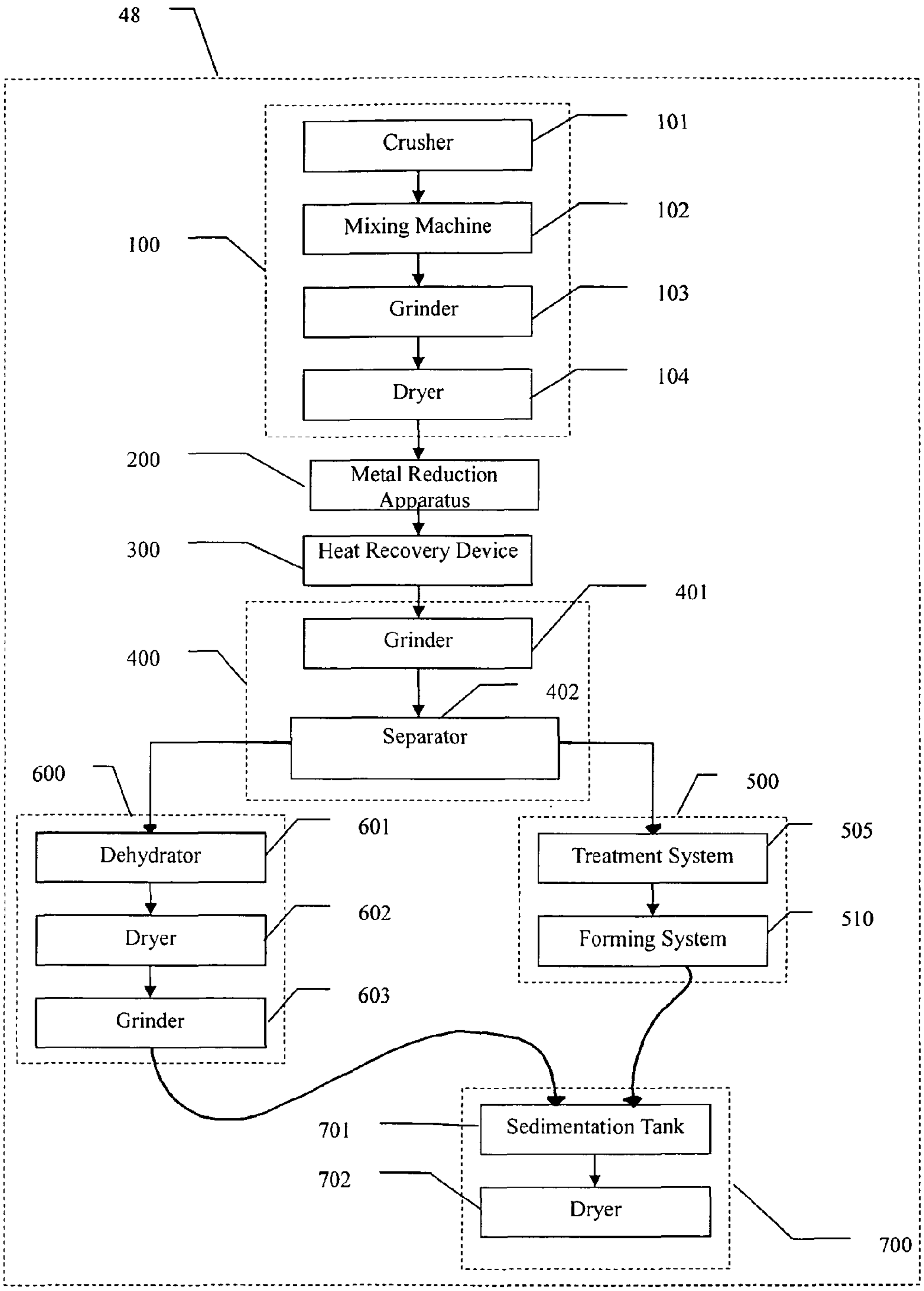
FIG. 4 is a flow chart for an exemplary metallurgical system in accordance with the present disclosure.

The disclosure also provides a metal reduction system. FIG. 4 illustrates such a system. The metal reduction system 48 comprises, in order from most upstream to most downstream, a material preparation system 100, a metal reduction apparatus 200, a heat recovery device 300, and a separator system 400. Additionally, the metal reduction system 48 includes, in parallel, a metal product system 500 and a residue utilization system 600, both of which are located downstream of the separator system 400. The metal reduction system 48 also includes an additive recovery system 700, which may be located downstream of the metal product system 500 and/or the residue utilization system 600. It is understood that the metal reduction system 48 may include additional or alternative components for carrying out the processes disclosed herein. Moreover, it is understood that the metal reduction system 48 need not be capable of carrying out every process disclosed herein, and need not include all of the components shown in FIG. 4.

The material preparation system 100 is used to prepare a mixture in the form of fine particles. This mixture may include at least one metal-containing material, at least one reducing agent, and at least one additive. As shown in FIG. 4, the material preparation system 100 may include a crusher 101 for crushing the at least one metal-containing material, the at least one reducing agent, and/or the at least one additive; a mixing machine 102 for mixing the at least one metal-containing material, the at least one reducing agent, and the at least one additive; a grinder 103, for example, a ball mill, for grinding the mixture into fine particles; and a dryer 104 for drying the ground mixture. It is understood that the material preparation system 100 may include one or more alternative machines for forming the fine particles, and that such one or more machines may individually form the at least one metal-containing material, the at least one reducing agent, and the at least one additive into fine particles, or may form the fine particles from a combination of one or more of the at least one metal-containing material, the at least one reducing agent, and the at least one additive.

Figure 5:
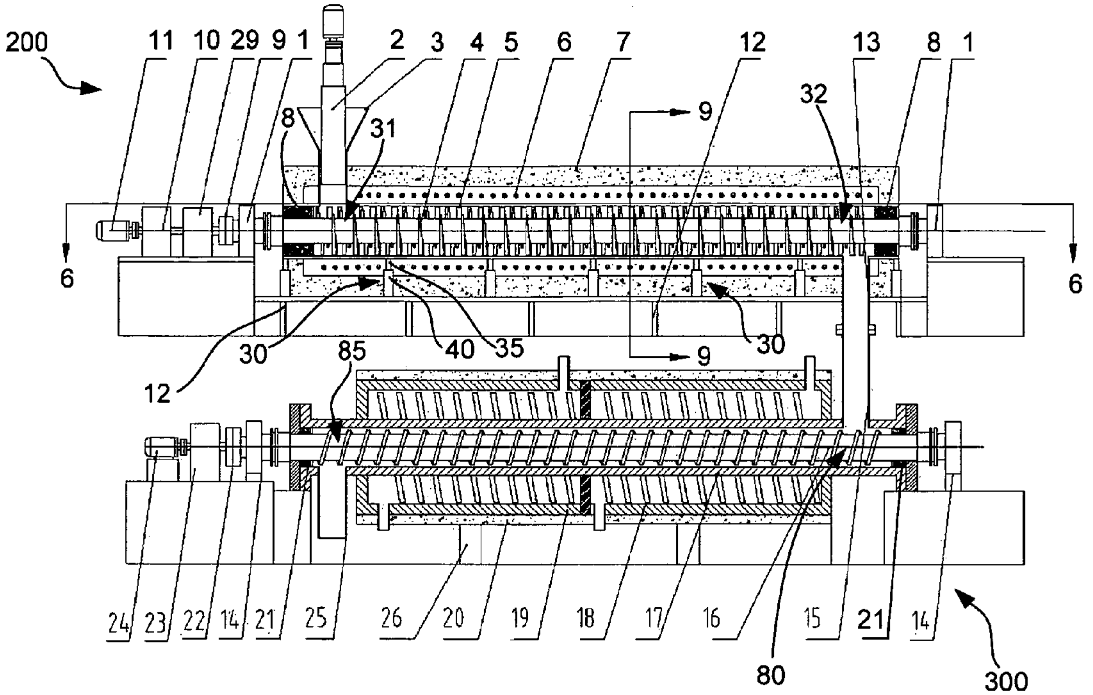
FIG. 5 shows an exemplary metal reduction apparatus in accordance with the present disclosure.
Figure 6:
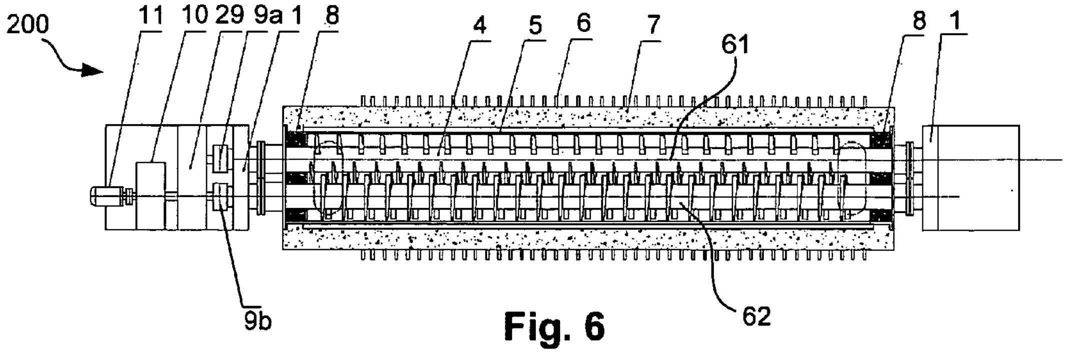
FIG. 6 shows the horizontal cross section taken at the line 6-6 of the metal reduction apparatus as shown in FIG. 5.
Figure 9:
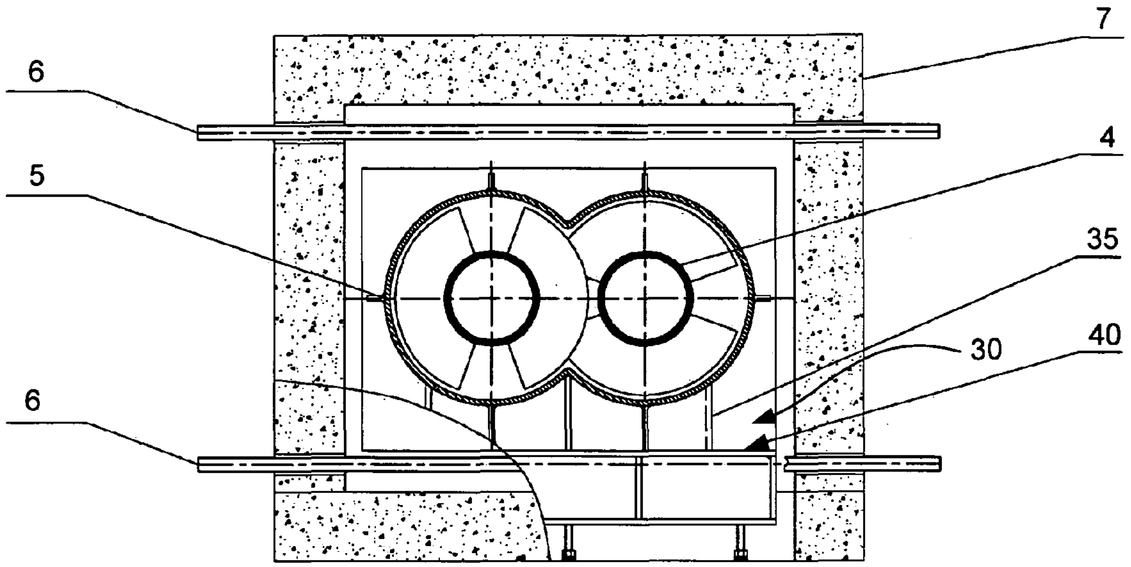
FIG. 9 is a view of a vertical cross section taken at the line 9-9 of the metal reduction apparatus as shown in FIG. 5.

The metal reduction apparatus 200 is used to effect a reduction reaction of the metal-containing material and extract simple substance metal. FIG. 5 depicts an exemplary embodiment of the metal reduction apparatus 200 and the heat recovery device 300. FIG. 6 is a cross section taken at the line 6-6 of the metal reduction apparatus 200 shown in FIG. 5, and FIG. 9 is a cross section taken at the line 9-9 of the metal reduction apparatus 200 shown in FIG. 5. As shown in FIGS. 5, 6, and 9, the metal reduction apparatus 200 includes two propelling blender support devices 1, a press-type loading device 2, a feed hopper 3, a propelling blender 4, a reactor housing 5, a heating device 6, an insulating layer 7, high-temperature seals 8, two couplers 9 (a coupler 9*a* and a coupler 9*b*), a gear bank 29, a speed reducer 10, a motor 11, a housing base support 12, housing sliding supports 30, and a discharge pipe 13.

The parts of the metal reduction apparatus 200 may be made of metallic or non-metallic materials that are capable of withstanding the operating temperature of the metal reduction apparatus 200. For example, the metal reduction apparatus 200 may be made of metallic or non-metallic materials that are capable of withstanding temperatures of between about 600° C. and about 3000° C. High temperature steel can, for example, be used for many of the parts of the metal reduction apparatus 200.

During operation of the metal reduction apparatus 200, the press-type loading device 2, which is coupled to the feed hopper 3, presses feed material (the mixture) in the feed hopper 3 into an upstream portion 31 of the housing 5. It is understood, however, that other components or arrangements could be used to load the feed material into the upstream portion 31 of the housing 5. For example, a mere gravity feed or a rotary type pump could be used to load the feed material into the upstream portion 31 of the housing 5. The housing 5 is supported by the housing base support 12, sealed at each end by the high-temperature seals 8, and at least partially covered by the heating device 6. The heating device 6 is at least partially covered by the insulating layer 7, and provides heat to the material via the housing 5. Thus, it is understood that the heating device 6 may be thermally coupled to the housing 5. As used herein, a first structure is thermally coupled to a second structure if heat can be transferred between the first structure and the second structure either directly or indirectly. The propelling blender 4 is located in the housing 5, and may include two shafts arranged parallel to each other. It is understood, however, that the propelling blender 4 may include another number of shafts (e.g., one or more shafts), and that these shafts may or may not be arranged parallel to each other.

Regardless of the number of shafts, each end of each shaft is connected to and supported by one of the propelling blender support devices 1. And, one end of each shaft is connected to one coupler 9 (e.g., one end of a shaft 61 is connected to the coupler 9*a*, and one end of a shaft 62 is connected to the coupler 9*b*). The couplers 9 are connected to the gear bank 29, which is in turn connected to the speed reducer 10 and the motor 11. The motor 11 provides rotation power to the gear bank 29 via the speed reducer 10. The gear bank 29 apportions the rotation power between the couplers 9, and the couplers 9 provide the rotation power to the shafts of the propelling blender 4. It is understood that the metal reduction apparatus 200 need not necessarily include the gear bank 29. For example, in embodiments of the propelling blender 4 having only one shaft, the speed reducer 10 may receive rotation power from the motor 11, and provide the rotation power directly to the coupler 9 connected to the one shaft. Alternatively, the metal reduction apparatus 200 could include one motor 11 and one speed reducer 10 for each shaft of the propelling blender 4, and each motor 11 could provide rotation power to one shaft via one speed reducer 10 and one coupler 9. In any case, rotation of the one or more shafts of the propelling blender 4 stirs and propels the feed material through the housing 5 to a downstream portion 32 of the housing 5, where the material is discharged from the metal reduction apparatus 200 via the discharge pipe 13.

The insulating layer 7 may be applied to the exterior surface of the heating device 6, and may help prevent heat from escaping the heating device 6 and the housing 5. The high-temperature seals 8 are attached to both ends of the housing 5, and may withstand the operating temperature of the metal reduction apparatus 200. The high-temperature seals 8 may help retain an oxygen-depleted environment in the housing 5 (e.g., by preventing oxygen from entering the housing 5), and may help prevent dust in the housing 5 from escaping into mechanical parts of the metal reduction system 48.

Figure 7:
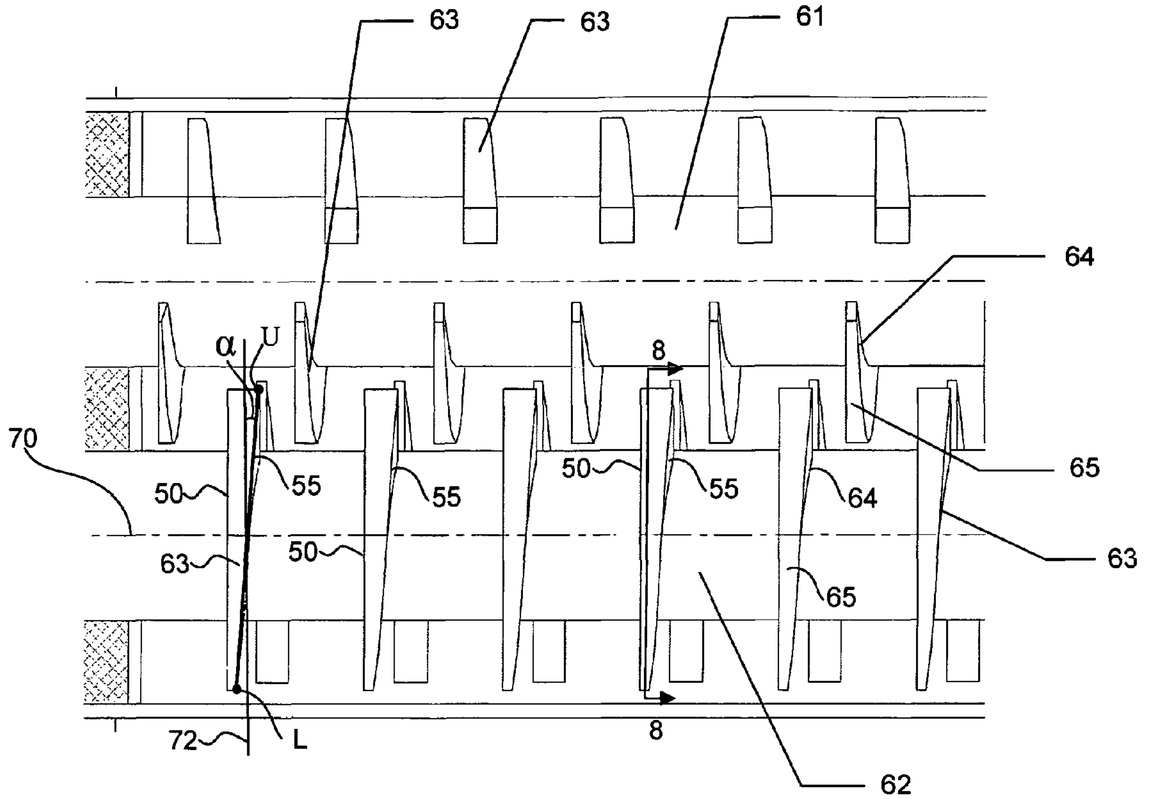
FIG. 7 is an enlarged view of a portion of the propelling blender as shown in FIG. 6.

An enlarged view of the propelling blender 4 is shown in FIG. 7. As noted above, the propelling blender 4 may include two shafts 61, 62 that may be arranged parallel to each other. Each of shafts 61, 62 may have a plurality of blades 63 configured intermittently along its circumference (FIG. 8) and along its length (FIG. 7). It is understood, however, that each of shafts 61, 62 could have fewer or more blades 63. For example, each of shafts 61, 62 could have a single blade extending along its length, and this single blade could be formed in a helical configuration.

Referring to the shaft 62 illustrated in FIG. 7, each of the blades 63 may have an upstream face 50 and a downstream face 55. The upstream face 50 of each blade 63 may be generally normal to a longitudinal axis 70 of the shaft 62, and the downstream face 55 of each blade 63 may be tilted with respect to a plane 72 extending normal to the longitudinal axis 70 of the shaft 62. In particular, the downstream face 55 of each blade 63 may include an angle of tilt a of between about 1° and about 45°. It is understood that the downstream face 55 may be planar or nonplanar, and that the angle of tilt $\alpha$ of a nonplanar downstream face 55 would be determined using a line between points U and L, as shown in FIG. 7. The angle of tilt $\alpha$ may be the same for each of the blades 63 of the shaft 62, in which case the blades 63 are said to be arranged parallel to each other. Alternatively, the angle of tilt $\alpha$ may vary between the blades 63 of the shaft 62, and may increase or decrease along the length of the shaft 62. For example, the angle of tilt α of a blade 63 at an upstream end of the shaft 62 may differ from the angle of tilt α of a blade 63 at a downstream end of the shaft 62 by between about 5° and about 15°. Such variation in the angle of tilt α may improve the propulsion and stirring of the feed material by the propelling blender 4.

Figure 8:
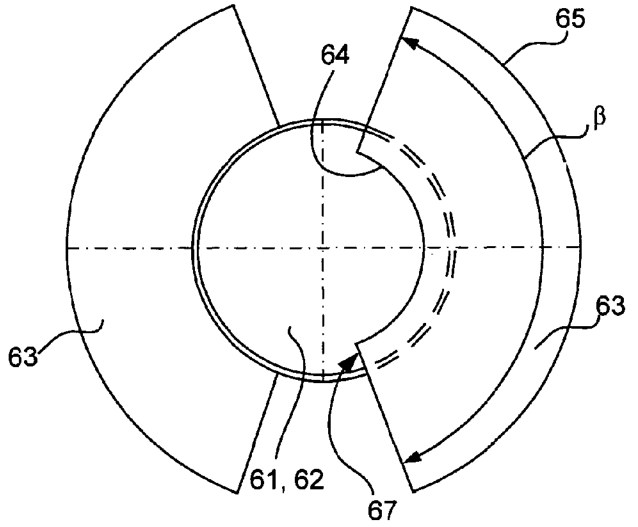
FIG. 8 is a view of the propelling blender as shown in cross section 8-8 of FIG. 7.

The blades 63 may also be slightly bent. Specifically, the radially inner edge 64 of each blade 63 may be twisted relative to the radially outer edge 65 of the blade 63. Moreover, the thickness of each blade 63 may vary along the arc of the blade 63, and the inner edge 64 of each blade 63 may be positioned within a recess 67 of the shaft 62, as illustrated in FIG. 8. This recessed coupling engagement of the blade 63 to the shaft 62 may help prevent the blade 63 from being bent or broken during operation of the metal reduction apparatus 200. Additionally, the blade 63 may be covered by at least one abrasion resistant material, which may help to prevent and/or slow wearing of the blade 63 during operation of the metal reduction apparatus 200. For example, the wear resistant material may include nickel, chrome, titanium, diamond, and/or another material or combination of materials that is resistant to wear. Alternatively, the blade 63 may be treated to resist abrasion. For example, the blade 63 may be heat treated or otherwise treated to resist abrasion.

As illustrated in FIG. 8, each blade 63 may be substantially C-shaped, as viewed in a longitudinal direction of the shaft 62, and may extend for an arc β around the shaft 62. For example, β may be between about 120° and about 160°, and may be about 140°. Alternatively, β may be smaller than about 120° or larger than about 160°. As shown in FIG. 7, the C-shaped blades 63 may be located at the same circumferential position along shaft 62. Alternatively, the C-shaped blades 63 may be located at different circumferential positions along the shaft 62. Finally, it is understood that the above discussion of the various configurations of blade 63 on shaft 62 is equally applicable to the blades 63 on shaft 61, and that shafts 61, 62 may have the same or varying configurations. For example, the blades 63 on the shaft 61 may be positioned at varying longitudinal positions relative to the blades 63 on the shaft 62. This may allow the blades 63 on the shaft 61 to overlap the blades 63 on the shaft 62, as viewed in a longitudinal direction of the propelling blender 4. Thus, the blades 63 on the shaft 61 may mesh with the blades 63 on the shaft 62 during operation of the metal reduction apparatus 200.

Referring to FIGS. 5 and 6, the motor 11, along with the speed reducer 10, the gear bank 29, and the couplers 9, provides rotating power with adjustable speed to the shafts 61, 62 of the propelling blender 4. The motor 11 may include an AC motor, an AC variable-frequency motor, or another type of electric motor. Alternatively, the motor 11 may include a diesel engine, a gasoline engine, or another type of combustion engine.

The speed reducer 10 is used to coordinate the rotation speed of the shafts 61, 62 and the rotation speed of the motor 11. This coordination may be useful because the rotation speed of the motor 11 may be much higher than the desired rotation speed of the shafts 61, 62, and the amount of torque required by the shafts 61, 62 may be greater than the motor 11 can provide. The speed reducer 10 may take the form of a cylindrical gear reducer. But, it is understood that the speed reducer 10 may alternatively include a planetary gear reducer or another appropriate gear reducing arrangement.

The gear bank 29 may be used to apportion rotation power between the shafts 61, 62 of the propelling blender 4. For example, the gear bank 29 may evenly or unevenly distribute rotation power between the shafts 61, 62. The gear bank 29 may include, for example, one or more gears. Alternatively or additionally, the gear bank 29 may include, for example one or more chains, belts, pulleys, or other devices capable of apportioning rotation power between the shafts 61, 62.

The couplers 9 are used to compensate for radial, axial, and/or angular misalignment of the shafts 61, 62 of the propelling blender 4. The couplers 9 may improve the reliability of the metal reduction apparatus 200 by helping reduce the effect of deformations of the shafts 61, 62 caused by gravity and/or the operation of metal reduction apparatus 200. For example, the couplers 9 may each include one or more universal joints, Oldham couplings, Thompson couplings, or other couplers capable of transmitting torque while permitting radial, axial, and/or angular misalignment of the shafts 61, 62.

The propelling blender support devices 1 are used to support the shafts 61, 62 of the propelling blender 4. This support may improve the stability of the shafts 61, 62 by preventing the shafts 61, 62 from deforming and/or deflecting as a result of their own weight. Each propelling blender support device 1 may include one or more bearings, which may allow for relative longitudinal movement of the shafts 61, 62 as the shafts 61, 62 expand longitudinally. For example, the shafts 61, 62 may expand longitudinally (e.g., up to or more than about 10 cm) when high temperatures (e.g., about 1100° C.) are reached during operation of the metal reduction apparatus 200. The one or more bearings may include, for example, one or more of a bushing or sleeve bearing, a fluid bearing, a magnetic bearing, or another type of bearing that is designed to allow for relative longitudinal movement of the shafts 61, 62.

Referring to FIGS. 5 and 9, the housing base support 12 may support the housing 5, and may include a frame having one or more beams. Alternatively or additionally, the housing base support 12 may include one or more hangers, brackets, and/or other elements capable of supporting the housing 5, and/or other parts of the housing base support 12. Although the housing base support 12 may directly support the housing 5, it is contemplated that the housing base support 12 may alternatively or additionally support the housing 5 via the sliding supports 30, as illustrated in FIGS. 5 and 9. The plurality of sliding supports 30 may be located along the length and width of the housing 5. In any case, the housing base support 12 and/or sliding supports 30 may prevent the housing 5 from deforming and/or deflecting as a result of the weight of the housing 5. By preventing deformation and/or deflection of the housing 5, the housing base support 12 and/or the sliding supports 30 may also prevent the housing 5 from inhibiting rotation of the shafts 61, 62 of the propelling blender 4.

As shown in FIG. 5, each sliding support 30 may include a first element 35 and a second element 40 movably coupled to the first element 35. The first element 35 may be fixedly attached to the housing 5, and the second element 40 may be fixedly attached to the housing base support 12. The first and second elements 35 and 40 may, however, be moveable relative to each other. This relative movement allows the housing 5 to move relative to the housing base support 12 when the housing 5 expands longitudinally. For example, the housing 5 may expand longitudinally (e.g., by up to or more than about 10 cm) when high temperatures (e.g., about 1100° C.) are reached during operation of the metal reduction apparatus 200. In particular, each of first and second elements 35 and 40 may include flat and polished surfaces. And, the flat and polished surface of the first element 35 may be positioned on top of the flat and polished surface of the second element 40. The flat and polished surface of the first element 35 may then slide along the flat and polished surface of the second element 40 as the first element 35 moves relative to the second element 40. Alternatively, the first and second elements 35 and 40 may not include elements having flat and polished surfaces. For example, the first element 35 may alternatively include a wheel and the second element 40 may include a track so that the first element 35 may roll along the second element 40 as the housing 5 expands longitudinally. In yet another alternative, the first element 35 may include a track and the second element 40 may include a wheel, or first and second elements 35 and 40 may include other elements that are capable of moving relative to each other while supporting the housing 5.

The heating device 6 provides heat for the reduction reaction via the housing 5. The heating device 6 may include one or more low energy consumption heating units that are thermally coupled directly or indirectly to the housing 5. For example, each of the heating units may include a resistance heater, an infrared tube heater, a gas furnace, a mid-frequency heater, a coal furnace, a hot stove, a boiling furnace, a circulating fluidized bed furnace, a conveyor furnace, a heat exchange casing, or another unit capable of providing heat for metal reduction. Additionally, the heating device 6 may include one or more temperature controlling units, which may be controllably coupled to the heating unit. For example, each of the temperature controlling units may include one or more sensors and/or a controller. Each of the sensors of a temperature controlling unit may sense and communicate to the controller a parameter indicative of a temperature of the housing 5 and/or the mixture located within the housing 5. Based on this temperature, the controller may then adjust the operation of one or more of the heating units to maintain the temperature at a selected reduction temperature.

During a reduction process, the feed material (the mixture of the at least one metal-containing material, the at least one reducing agent, and the at least one additive) is fed from the feed hopper 3 into the housing 5. In the housing 5, the mixture is stirred and propelled by the propelling blender 4. The reduction reaction takes place in the housing 5, where the metal-containing material reacts with the reducing agents to produce a high temperature resulting composition, which includes simple substance metal and other products like waste gas and residue. The waste gas contains harmful elements, such as sulfur and phosphorus, which may be absorbed by the additives in the residue, minimizing environmental pollution. The high temperature resulting composition is then discharged through discharge pipe 13, and subjected to post-reduction processing.

The waste heat recovery device 300 is used to recover and reuse the heat from the reduction process. As shown in FIG. 5, the waste heat recovery device 300 is coupled to the metal reduction apparatus 200. The waste heat recovery device 300 is configured to receive the high temperature resulting composition from the metal reduction apparatus 200, and recover heat from the high temperature resulting composition.

As shown in FIG. 5, the waste heat recovery device 300 may include two conveyor support devices 14, a feed pipe 15, a conveyor 16, a heat recovery device housing 17, heat exchange casings 18 and 19, an insulating layer 20, high-temperature seals 21, a coupler 22, a speed reducer 23, a motor 24, a housing base support 26, and a discharge pipe 25.

During operation of the waste heat recovery device 300, the resulting composition discharged from the metal reduction apparatus 200 is fed into an upstream portion 80 of the housing 17 via the feed pipe 15. For example, the discharge pipe 13 of the metal reduction apparatus 200 may be connected to the feed pipe 15, and the resulting composition may be fed directly from the metal reduction apparatus 200 into the housing 17 via the feed pipe 15. Alternatively, other structures may be positioned between the discharge pipe 13 and the feed pipe 15, and the resulting composition may be fed indirectly into the housing 17 via the feed pipe 15. The housing 17 is supported by the housing base support 26, sealed at each end by the high-temperature seals 21, and at least partially covered by the heat exchange casings 18 and 19. The heat exchange casings 18 and 19 are at least partially covered by the insulating layer 20, and recover heat from the resulting composition via the housing 17. Thus, it is understood that the heat exchange casings 18 and 19 are thermally coupled to the housing 17. The conveyor 16 is located in the housing 17, and may include a shaft. Each end of the shaft is connected to and supported by one of the conveyor support devices 14. And, one end of the shaft is connected to the coupler 22, which is in turn connected to the speed reducer 23 and the motor 24. The motor 24 provides rotation power to the shaft of the conveyor 16 via the speed reducer 23 and the coupler 22. Rotation of the shaft of the conveyor 16 propels the resulting composition through the housing 17 to a downstream portion 85 of the housing 17, where the resulting composition is discharged from the heat recovery device 300 via the discharge pipe 25.

Some structures of the heat recovery device 300 are similar to those of the metal reduction apparatus 200. In particular, the conveyor support devices 14 are similar to the propelling blender support devices 1, the heat recovery housing 17 is similar to the reactor housing 5, the insulating layer 20 is similar to the insulating layer 7, the high-temperature seals 21 are similar to the high-temperature seals 8, the coupler 22 is similar to the couplers 9, the speed reducer 23 is similar to the speed reducer 10, the motor 24 is similar to the motor 11, the housing base support 26 is similar to the housing base support 12, and the discharge pipe 25 is similar to the discharge pipe 13.

The heat exchange casings 18 and 19 recover heat from the resulting composition via the housing 17. Each of the heat exchange casings 18 and 19 may include a heat-conductive medium, which may absorb and/or store heat from the resulting composition, thereby helping to cool the resulting composition. This heat may be used to assist in drying the materials that need drying, and may reduce the total energy consumption of the metal reduction system 48. For example, the heat-conductive medium of the heat exchange casing 18 may include oil, and the heat-conductive medium of the heat exchange casing 19 may include water. Alternatively, the heat-conductive medium of the heat exchange casing 18 may include water, and the heat-conductive medium of the heat exchange casing 19 may include oil. In yet another alternative, the heat-conductive mediums of the heat exchange casings 18 and 19 may include gas or other mediums capable of absorbing and/or storing heat, and may each include the same or different mediums. In any case, the heat-conductive medium(s) may be circulated among various components of the metal reduction system 48 to transfer heat between the various components.

Referring to FIG. 4, the separator system 400 is used to separate the reduced metal exiting the metal reduction apparatus 200 from the residue. As shown in FIG. 4, the separator system 400 may include a grinder 401 for grinding the resulting composition. For example, the grinder 401 may include a ball mill, a supergravity mill, or another type of grinder capable of grinding the resulting composition. Additionally, the separator system 400 may include a separator 402 for separating the reduced metal from the residue. For example, the separator 402 may include a magnetic separator for separating magnetic metal from the residue. Alternatively, the separator 402 may include a gravity separator for separating nonmagnetic metal from the residue. In yet another alternative, the separator 402 may include a flotation separator, an electrostatic separator, or another type of separator capable of separating nonmagnetic metal from the residue.

The metal product system 500 may be used to manufacture metal products with the reduced metal. As shown in FIG. 4, the metal product system 500 may include a treatment system 505 for treating the reduced metal. The treatment system 505 may include a dehydrator for removing water from the reduced metal. For example, the dehydrator may include a strong magnetic dehydrator, a centrifuge (e.g., a horizontal-type spiral centrifuge), a vacuum filtration unit, a pressure filtration unit, or another device capable of removing water from the reduced metal. Additionally, the treatment system 505 may include a dryer for drying the reduced metal. The treatment system 505 may also include a passivation system for forming an inert film on the surface of reduced metal (e.g., for treating the reduced metal to be inert, for example, to be difficult to be reoxidized). Alternatively or additionally, the treatment system 505 may include a device for heat treating or otherwise treating the reduced metal.

The product system 500 may also include a forming system 510 for forming the reduced metal. For example, the forming system 510 may include a cold press configured to briquette a mixture of the reduced metal and a binder into a metal product. Alternatively or additionally, the forming system 510 may include a device for cutting, stamping, bending, rolling, or otherwise forming the reduced metal into a metal product.

The residue utilization system 600 is used for comprehensive utilization of the residue. As shown in FIG. 4, the residue utilization system 600 may include a dehydrator 601 for removing water from the residue. For example, the dehydrator 601 may include a strong magnetic dehydrator, a centrifuge (e.g., a horizontal-type spiral centrifuge), a vacuum filtration unit, a pressure filtration unit, or another device capable of removing water from the residue.

Alternatively or additionally, the residue utilization system 600 may include a dryer 602 for drying the residue. The residue utilization system 600 may also include a grinder 603 for grinding the residue so that it is suitable for, for example, use as a cement admixture. For example, the grinder 603 may include a ball mill, a supergravity mill, or another type of grinder capable of grinding the residue.

The additive recovery system 700 is used to recover and reuse at least one additive contained in the water removed by the dehydrators of the metal product system 500 and/or the residue utilization system 600. As shown in FIG. 4, the additive recovery system 700 may include a sedimentation tank 701 or another device capable of increasing the concentration of the at least one additive in the water. Additionally, the additive recovery system 700 may include a dryer 702 for drying the water, and recovering the at least one additive.

The metal reduction system 48 of the present disclosure may provide at least one of the following benefits:

1. Low energy consumption. As show in FIG. 5, the heating device 6, which includes, for example, a low energy consumption heating unit such as an infrared tube heater, at least partially covers the housing 5, and thus heats the feed materials where the reduction reaction occurs. Therefore, the proximity of the low energy consumption heating unit to the housing 5 allows the metal reduction system 48 to avoid needlessly heating other structures. The metal reduction system 48 uses the propelling blender 4 to propel and stir the feed material, increasing contact between the fine particles of the feed material. This increased contact greatly reduces the reaction time and enhances heat conductivity between the feed material and the components of the metal reduction system 48. The feed material is ground into fine particles before entering the housing 5, and thus reacts at a low reduction temperature. The exterior surface of the housing 5 is at least partially covered by the insulating layer 7, and thus heat loss is reduced. These features greatly reduce energy consumption.

2. Low investment. Using the propelling blender 4 to propel and stir the feed material alleviates the need for pelletizing the feed material. Thus, investment in pelletizing equipment is unnecessary. Moreover, during the reduction reaction as disclosed herein, a solid reducing agent such as, for example, coal is used, and thus the present disclosure no longer needs devices for generating and transporting gaseous reducing agents such, for example, CO and $H_2$. Additionally, due to its simple structure, the manufacturing costs of the metal reduction apparatus 200 are much lower than those of other metal reduction apparatuses.

3. Use of low-grade ores and reactants. The metal reduction system 48 allows for the use of low-grade ores and reactants. Before being fed into the metal reduction apparatus 200, the at least one metal-containing material, the at least one reducing agent (e.g., coal), and the at least one additive are well ground and mixed. The at least one metal-containing material, the at least one reducing agent, and the at least one additive are then further mixed by the propelling blender 4. This "double mixing" increases contact between the at least one additive, the at least one metal-containing material, and the at least one reducing agent. The increased contact helps lower the grade requirement of the at least one metal-containing material and increase the reduction rate of the metal.

4. Modular design. The metal reduction system 48 may have a modular design. With a modular design, the metal reduction system 48 can accommodate different production needs by combining a flexible number of modules in a flexible way. The metal reduction system 48 may integrate systems having five functions: heating the feed material with minimum energy; propelling and stirring the feed material; reducing the metal; recycling waste heat; and absorbing harmful waste gas generated in the metallurgical process with the at least one additive, and maintaining the waste gas in the residue. This greatly reduces the quantity and complexity of equipment, rendering the metal reduction process simple and reliable.

5. Superior quality product. As discussed above, matters that are harmful to the environment and quality of the metal products, such as sulfur and phosphorous, are absorbed by the at least one additive and maintained in the residue. Thus, only very low levels of the harmful matters are present in the reduced metal, and superior quality products are produced by the metal reduction system 48.

6. Flexibility. The power units may include motors, speed reducers, and couplers, all of which are highly adaptable and reliable, and can accommodate a wide range of material qualities and production conditions.

7. Self-protection of the equipment. The materials move intensely in the housing 5, driven by the propelling blender 4. And a protection layer of the resulting composition may be formed on an inner wall of the housing 5 in an area not reached by the blades 63 of the propelling blender 4. The protection layer provides an isolated environment, such as an oxygen depletion environment, for the reduction reaction and can help reduce wearing and corrosion of the inner wall of the housing 5.

8. Environmentally friendly. The metal reduction system 48 may remove sulfur, phosphorus, and other harmful matters during the reduction reaction process.

In summary, the metal reduction system 48 of the present disclosure may have the advantages of low investment, high productivity, low energy consumption, and low environmental pollution. The metal reduction system 48 can be used to handle ores that are hard to separate and reduce, for example, ultra low-grade ores, and metal-containing industrial waste. The metal reduction system 48 may have a high metal recovery rate, may produce a product having quality, and may comprehensively utilize resources.

The present disclosure could be illustrated by the following non-limiting example.

Example of a Metallurgical Process in Accordance With the Present Disclosure

Vanadium titano-magnetite containing iron was used in this example. The ores were dried and mixed with anthracite, calcium carbonate, and other additives to form a mixture. The mixture was ground and fed into a metal reduction apparatus to extract the metal. After the reduction, the resulting composition was cooled and subject to wet grinding and magnetic separation to separate iron from the residue. The iron and residue were dried, and then were used to produce final products.

(1) Preparation

Dried vanadium titano-magnetite (TFe 52.08%,), containing no more than 5% by weight of water relative to the weight of the vanadium titano-magnetite, anthracite in an amount of 16.9% by weight of the vanadium titano-magnetite; lime stone (primarily containing calcium carbonate) in an amount of 2.5% by weight of the vanadium titano-magnetite; and other additives in an amount of 14.9% by weight of the vanadium titano-magnetite were mixed. The mixture was ground using a ball mill to fine particles with a particle size of less than about 0.074 mm.

(2) Reduction Reaction

The reduction reaction was carried out at a temperature ranging from 1000° C. to 1050° C. for a period of time ranging from 60 minutes to 150 minutes. The resulting composition was cooled by a heat exchanger, and the heat was recovered and reused.

(3) Magnetic Separation

The cooled resulting composition was mixed with water at a mass ratio of 7 to 3, and then ground and washed using a ball mill. The iron was separated from the residue by a wet magnetic separation method. The collected iron had a grade of about 92%, and the iron recovery rate was about 85%.

While the present disclosure has been described in connection with what is considered to be the most practical embodiments, it should be noted that the disclosure is not limited to the disclosed embodiments; the scope of protection for this disclosure should be interpreted according to the claims, applying their broadest interpretation. A person of ordinary skill in this technical field would be able to make certain improvements and modifications, within the spirit and scope of this invention; such improvements and modifications should be considered within the scope of this invention.

I claim:

1. A metal reduction process comprising grinding at least one metal-containing material, at least one reducing agent, and at least one additive separately into the form of fine particles and mixing them together to form a mixture, adding the mixture into a reactor, heating the reactor to a selected reduction temperature, moving the mixture through the reactor while stirring the mixture, allowing a reduction period to occur, and obtaining resulting composition, wherein the resulting composition comprises at least one zero-valent metal and a residue, and wherein the resulting composition is in the form of particles comprising at least one zero-valent metal core and a coating.

2. The metal reduction process of claim 1, wherein the at least one zero-valent metal is iron and wherein the selected reduction temperature ranges from about 1000° C. to about 1050° C.

3. The metal reduction process of claim 1, wherein the solid particles have a particle size of no greater than about 10 mm.

4. The metal reduction process of claim 3, wherein the solid particles have a particle size of no greater than about 1 mm.

5. A metal reduction process comprising grinding at least one metal-containing material, at least one reducing agent, and at least one additive together to form a mixture in the form of fine particles, adding the mixture into a reactor, heating the reactor to a selected reduction temperature, moving the mixture through the reactor while stirring the mixture, allowing a reduction period to occur, and obtaining a resulting composition, wherein the resulting composition comprises at least one zero-valent metal and a residue, and wherein the resulting composition is in the form of solid particles comprising at least one zero-valent metal core and a coating.

6. The metal reduction process of claim 5, wherein the at least one zero-valent metal is iron and wherein the selected reduction temperature ranges from about 1000° C. to about 1050° C.

7. The metal reduction process of claim 5, wherein the solid particles have a particle size of no greater than about 10 mm.

8. The metal reduction process of claim 7, wherein the solid particles have a particle size of no greater than about 1 mm.

9. A metallurgical process, comprising a mixing stage, comprising at least one metal-containing material, at least one reducing agent, and at least one additive to form a mixture;

a metal reduction stage, comprising adding the mixture into a reactor, heating the reactor to a selected reduction temperature, moving the mixture through the reactor while stirring the mixture, allowing reduction period to occur, and obtaining a resulting composition, wherein the resulting composition comprises at least one zero-valent metal and a residue, and wherein the resulting composition is in the form of solid particles comprising at, least one zero-valent metal core and a coating, a grinding step, wherein the resulting composition is ground; and a separation stage, wherein the at least one zero-valent metal is separate from the residue.

10. The metallurgical process of claim 9, wherein the grinding step comprises a wet grinding method to grind the resulting composition.

11. The metallurgical process of claim 10, comprising adding water to the resulting composition before the grinding step wherein the weight ratio of the resulting composition to the water ranges from about 1:1 to about 4:1.

12. The metallurgical process of claim 11, wherein the weight ratio of the resulting composition to the water is about 7 to 3.

13. The metallurgical process of claim 9, wherein the grinding step comprises a dry grinding method to grind the resulting composition.

14. The metallurgical process of claim 9, wherein the grinding step is conducted such that the at least one zero-valent metal core is disassociated from the coating.

15. The metallurgical process of claim 9, wherein the grinding step takes about 5 minutes to about 40 minutes.

16. The metallurgical process of claim 9, further comprising a heat recovery stage, wherein, after the metal reduction stage is completed but before the grinding step, the resulting composition is cooled via at least one heat-conductive medium, and the absorbed heat in the at least one heat-conductive medium is reused for drying at least one material that needs to be dried.

17. The metallurgical process of claim 16, wherein the at least one heat-conductive medium is chosen from heat-conductive oils, water, and gas.

18. A metallurgical process, compromising a mixing stage, comprising mixing at least one metal-containing material, at least one reducing agent, and at least one additive to form a mixture;

a metal reduction stage, comprising adding the mixture into a reactor, heating the reactor to a selected reduction temperature, moving the mixture through the reactor while stirring the mixture, allowing a reduction period to occur, and obtaining a resulting composition, wherein the resulting composition comprises at least one zero-valent metal and a residue, and wherein the resulting composition is in the form of solid particles comprising al least one zero-valent metal core and a coating; and a separation stage, wherein the at least one zero-valent metal separated from the residue; and wherein the separation stage is conducted using at least one method chosen from magnetic separation methods, electrostatic separation methods, gravity separation methods, and flotation separation methods.

19. A metallurgical process, comprising a mixing stage, comprising mixing at least one metal-containing material, at least one reducing agent, and at least one additive to form a mixture;

a metal reduction stage, comprising adding the mixture into a reactor, heating the reactor to a selected reduction temperature, wherein the selected reduction temperature ranges from about 1000° C. to about 1050° C.

moving the mixture through the reactor while stirring the mixture, allowing a reduction period to occur, and obtaining a resulting composition, wherein the resulting composition comprises at least one zero-valent metal and a residue, and wherein the resulting composition is in the form of solid particles comprising at least one zero-valent metal core and a coating; and a separation stage, wherein the at least one zero-valent metal is separated from the residue; and wherein the at least one zero-valent metal is iron.

20. A metallurgical process, comprising a mixing stage, comprising mixing at least one metal-containing material, at least one reducing agent, and at least one additive to form a mixture;

a metal reduction stage, comprising adding the mixture into a reactor, heating the reactor to a selected reduction temperature, moving the mixture through the reactor while stirring the mixture, allowing a reduction period to occur, and obtaining a resulting composition, wherein the resulting composition comprises at least one zero-valent metal and a residue, and wherein the resulting composition is in the form of solid particles comprising at least one zero-valent metal core and a coating;

a separation stage, wherein the a least one zero-valent metal is separated from the residue; and after the separation stage, a stage for making a metal product, comprising treating the at least one zero-valent metal and forming the metal product, wherein the treatment of the at least one zero-valent metal comprises at least one step chosen from drying the at least one zero-valent metal, and forming an inert film on the surface of the at least one zero-valent metal and/or a stage for treating the residue.

21. A metallurgical process, comprising a mixing stage, comprising mixing at east one metal-containing material, at least one reducing agent, and at least one additive to form a mixture;

a metal reduction stage, comprising adding the mixture into a reactor, heating the reactor to a selected reduction temperature, moving the mixture through the reactor while stirring the mixture, allowing a reduction period to occur, and obtaining a resulting composition, wherein the resulting composition comprises at least one zero-valent metal and a residue, and wherein the resulting composition is in the form of solid particles comprising at least one zero-valent metal core and a coating;

a separation stage, wherein the at least one zero-valent metal separated from the residue; and after the separation stage, a stage for making a metal product, comprising treating the at least one zero-valent metal and forming the metal product, wherein the formation of the metal product comprises mixing at least one binder with the at least one zero-valent metal, and briquetting the mixture of the at least one zero-valent metal and the at least one binder to form the metal product;

and/or a stage for treating the residue.

22. The metallurgical process of claim 21, wherein the at least one binder is present in an amount ranging from about 0.5% to about 5% by weight relative to the total weight of the metal product.

23. The metallurgical process of claim 22, wherein the at least one binder is present in an amount of about 2% by weight relative to the total weight of the metal product.

24. The metallurgical process of claim 21, wherein the at least one binder is chosen from cement clinkers with a specific surface area of higher than about 600 $m^2/kg$.

25. A metallurgical process, comprising a mixing stage, comprising at least one metal-containing material, at least one reducing agent, and at least one additive to form a mixture;

a metal reduction stage, comprising adding the mixture into a reactor, heating the reactor to a selected reduction temperature, moving the mixture through the reactor while stirring the mixture, allowing a reduction period to occur, and obtaining a resulting composition, wherein the resulting composition at least one zero-valent metal and a residue, and wherein the resulting composition is in the form of solid particles comprising at least one zero-valent metal core and a coating;

a separation stage, wherein the at least one zero-valent metal is separated from the residue; and after the separation stage, a stage for making a metal product; and/or a stage for treating the residue, comprising at least one step chosen from
dewatering the residue, and drying the residue, and
grinding the residue.

26. A metallurgical process, comprising
a mixing stage, comprising mixing at least one metal-containing material, at least one reducing agent, and at least one additive to form a mixture;
a metal reduction stage, comprising
adding the mixture into a reactor,
heating the reactor to a selected reduction temperature,
moving the mixture through the reactor while stirring the mixture, allowing a reduction period to occur, and
obtaining a resulting composition, wherein the resulting composition comprises at least one zero-valent metal and a residue, and wherein the resulting composition is in the form of solid particles comprising at least one zero-valent metal core and a coating;
a separation stage, wherein the at least one zero-valent metal is separated from the residue; and
after the separation stage,
a stage for making a metal product, comprising
treating the at least one zero-valent metal and
forming the metal product,
wherein the treatment of the at least one zero-valent metal comprises a dewatering step wherein water is removed from the at least one zero-valent metal;
and/or
a stage for treating the residue.

27. The metallurgical process of claim 26, wherein the dewatering step is conducted using at least one method chosen from strong magnetic dehydrations, centrifugation dehydration, vacuum filtration, and pressure filtrations.

28. A metallurgical process, comprising
a mixing stage, comprising mixing at least one metal-contain material, at least one reducing agent, and at least one additive to form a mixture;
a metal reduction stage, comprising
adding the mixture into a reactor,
heating the reactor to a selected reduction temperature,
moving the mixture through the reactor while stirring the mixture, allowing a reduction period to occur, and
obtaining a resulting composition, wherein the Resulting compositions comprises at least one zero-valent metal and a residue and wherein resulting composition is in the form of solid comprising at least one zero-valent metal core and a coating;
a separation stage, wherein the at least one zero-valent metal is separated from the residue; and
after the separation stage,
a stage for making a metal product; and/or
a stage for treating the residue, wherein the stage for treating the residue comprises at least one step chosen from dewatering the residue, and drying the residue, and
wherein the dewatering step is conducted using at least one method chosen from strong magnetic dehydrations, centrifugation dehydration, vacuum filtration, and pressure filtrations.

29. A metallurgical process, compromising
a mixing stage, comprising mixing at least one metal-containing material, at least one reducing agent, and at least one additive to form a mixture;

a metal reduction stage, comprising
adding the mixture into a reactor,
heating: the reactor to a selected reduction temperature,
moving the mixture through the reactor while stirring the mixture, allowing a reduction period to occur, and
obtaining a resulting composition, wherein the resulting composition comprises at least one zero-valent metal and a residue, and wherein the resulting composition is in the form of solid particles comprising at least one zero-valent metal core and a coating; and
a separation stage, wherein the at least one zero-valent metal is separated from the residue;
wherein the metallurgical process further comprises a wet grinding step following the metal reduction stage but before the separation stage, and at least one dewatering step after the separation stage wherein the separated residue is dewatered resulting in a solid portion and an aqueous portion, and the at least one additive is recovered by adjusting the concentration of the at least one additive in the aqueous portion to be close to the saturation concentration of the at least one additive, and drying the aqueous portion.

30. The metallurgical process of claim 29, wherein the at least one dewatering step comprises
a first dewatering step after the separation stage wherein the residue is dewatered resulting in a solid portion and a first dewatering aqueous portion, at least one washing step wherein the solid portion is washed, and
at least one second dewatering step resulting in at least one second dewatering aqueous portion, wherein the at least one additive is recovered by using the first dewatering aqueous portion and the at least one second dewatering aqueous portion in the wet grinding step until the concentration of the at least one additive in the first dewatering aqueous portion or the at least one second dewatering aqueous portion is to be close to the saturation concentration of the at least one additive and drying said first dewatering aqueous portion or the at least one second dewatering aqueous portion.

31. A metallurgical process, comprising
a mixing stage, at least one metal-containing material, at least one reducing agent, and at least one additive to form a mixture;
a metal reduction stage, comprising
adding the mixture into a reactor,
heating the reactor to a selected reduction temperature,
moving the mixture through the reactor while stirring the mixture, allowing a reduction period to occur, and
obtaining a resulting composition, wherein the resulting composition comprises at least one zero-valent metal and a residue, and wherein the resulting composition is in the form of solid particles comprising at least one zero-valent metal core and a coating; and
a separation stage, wherein the at least one zero-valent metal is separated from the residue, and
wherein the solid particles have a particle size of no greater than about 10 mm.

32. The metallurgical process of claim 31, wherein the solid particles having a particle size of no greater than about 1 mm.

* * * * *

UNITED STATES PATENT AND TRADEMARK OFFICE

CERTIFICATE OF CORRECTION

PATENT NO. : 8,518,146 B2
APPLICATION NO. : 12/824611
DATED : August 27, 2013
INVENTOR(S) : Bairong Li It is certified that error appears in the above-identified patent and that said Letters Patent is hereby corrected as shown below:

In the claims

*In Claim 25, Col. 24, Line 60, "composition" should read --composition comprises--.

*In Claim 28, Col. 25, Lines 36-37, "metal-contain" should read --metal containing--.

*In Claim 28, Col. 25, Lines 44-45, "Resulting compositions" should read --resulting composition--.

*In Claim 28, Col. 25, Line 46, "residue" should read --residue,--.

*In Claim 28, Col. 25, Line 46, "resulting" should read --the resulting--.

*In Claim 28, Col. 25, Line 47, "solid" should read --solid particles--.

*In Claim 29, Col. 26, Line 3, "heating:" should read --heating--.

*In Claim 31, Col. 26, Line 43, "at least" should read --comprising mixing at least--.

*In Claim 32, Col. 26, Line 62, "having" should read --have--.

Signed and Sealed this
Third Day of December, 2013

Margaret A. Focarino

Margaret A. Focarino
*Commissioner for Patents of the United States Patent and Trademark Office*